United States Patent [19]
Kawana et al.

[11] Patent Number: 6,075,904
[45] Date of Patent: Jun. 13, 2000

[54] IMAGE PROCESSING APPARATUS AND METHOD WHICH PREVENTS THE GENERATION OF A WHITE STRIPE ON AN OUTPUT IMAGE

[76] Inventors: Takashi Kawana; Tetsuya Kobayashi, both of c/o Canon Kabushiki Kaisha 30-2, Shimomaruko 3-chome, Ohta-ku, Tokyo, Japan

[21] Appl. No.: 08/662,152

[22] Filed: Jun. 12, 1999

[30] Foreign Application Priority Data

Jun. 14, 1995 [JP] Japan ..................................... 7-147907
Nov. 28, 1995 [JP] Japan ..................................... 7-309112

[51] Int. Cl.$^7$ ....................................................... H04N 1/46
[52] U.S. Cl. ............................................ 382/266; 382/269
[58] Field of Search ..................................... 358/530, 532; 382/263, 266–269, 199–200

[56] References Cited

U.S. PATENT DOCUMENTS

| | | | |
|---|---|---|---|
| 4,800,442 | 1/1989 | Riseman et al. ........................ | 358/280 |
| 5,164,825 | 11/1992 | Kobayashi et al. ...................... | 358/160 |
| 5,357,583 | 10/1994 | Sato et al. ............................... | 382/269 |
| 5,669,172 | 9/1997 | Hattori et al. ........................... | 382/266 |

*Primary Examiner*—Thomas D. Lee
*Assistant Examiner*—Stephen Brinich

[57] ABSTRACT

An image processing apparatus for color-correcting image data for outputting to image forming means includes an input unit for inputting image data, a discrimination unit for determining whether or not the image data is of a predetermined color, a color correction unit for color-correcting the image data even if the image data is lower than a predetermined level in such a manner that a light emitting device in the image forming unit emits light at a small light emission level, and an output unit for outputting the color-corrected image data or image data generally representing white to the image forming means based on the result of the determination.

11 Claims, 40 Drawing Sheets

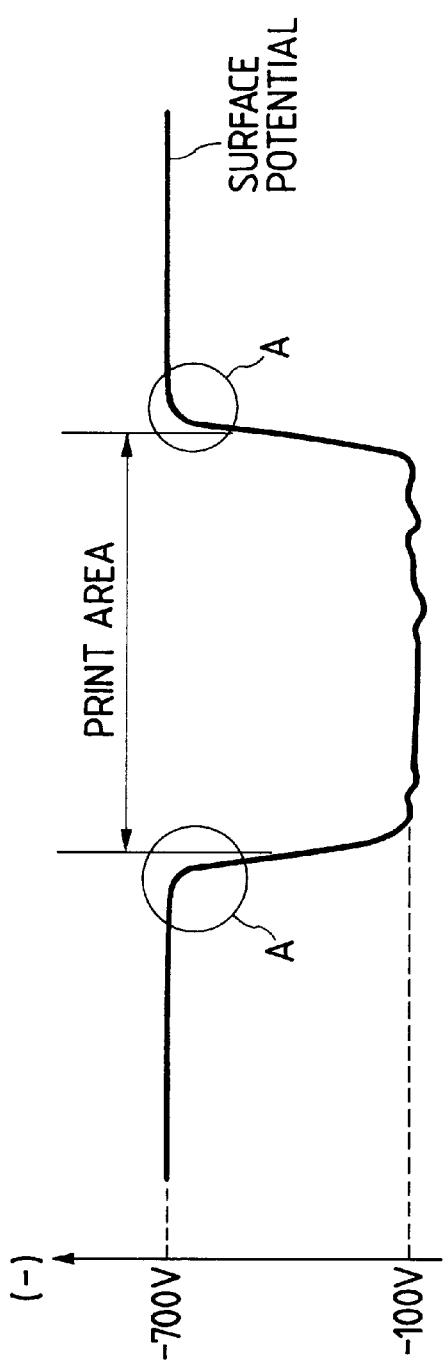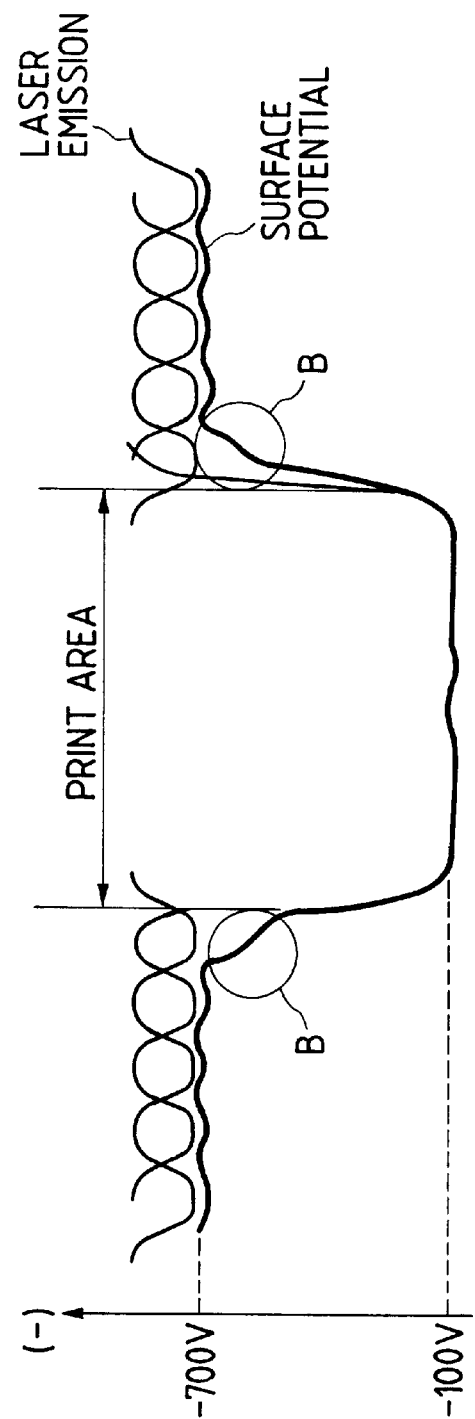
FIG. 2A
FIG. 2B

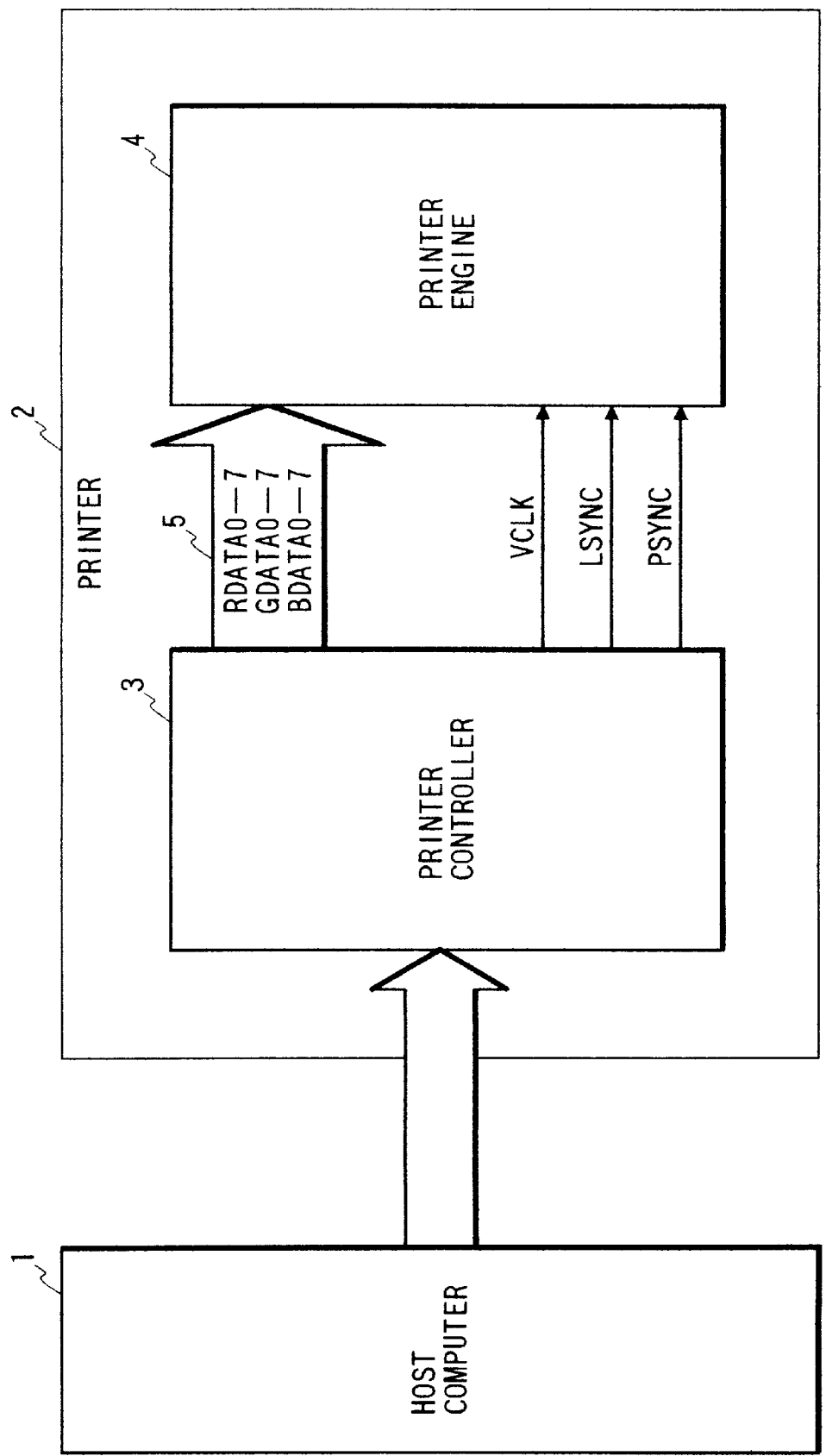

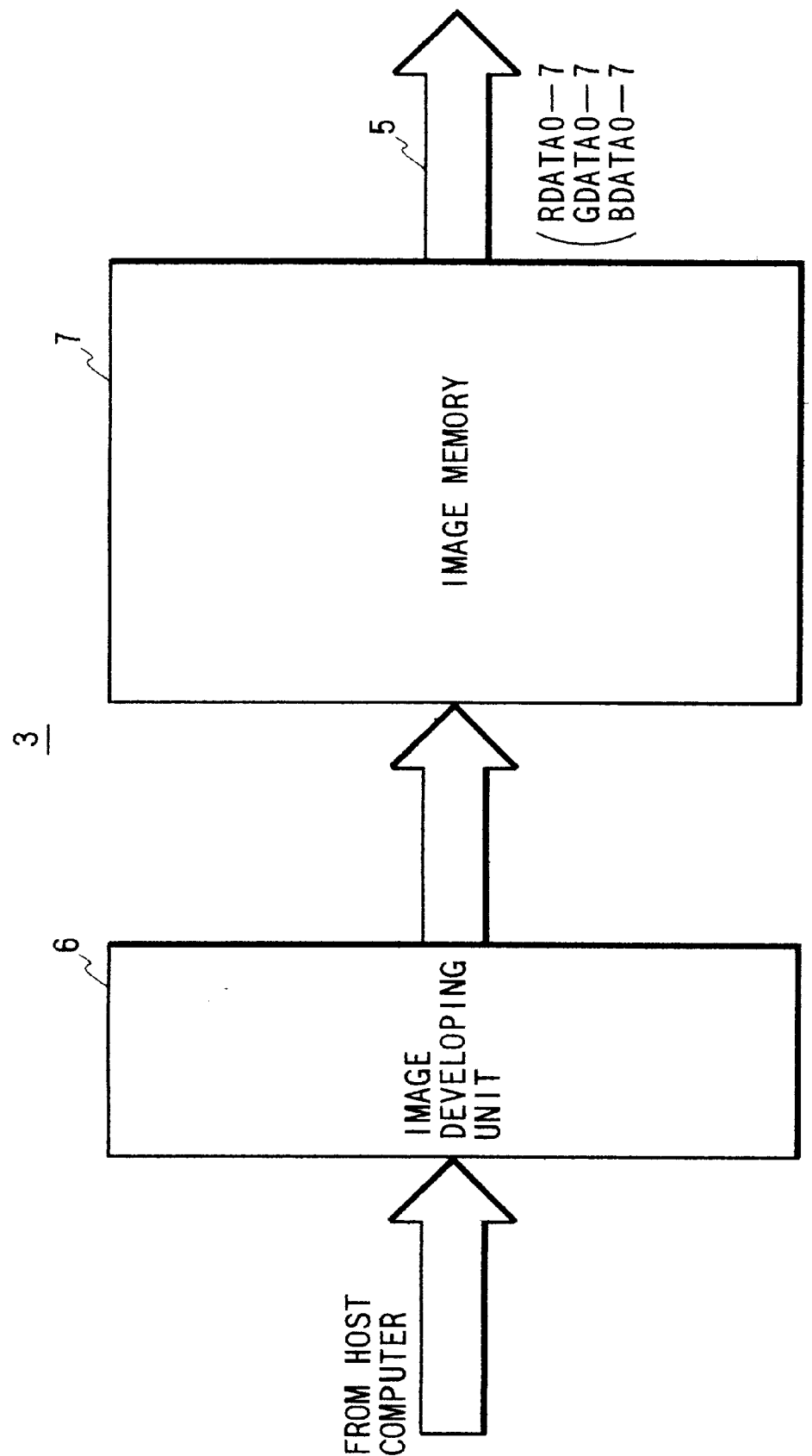

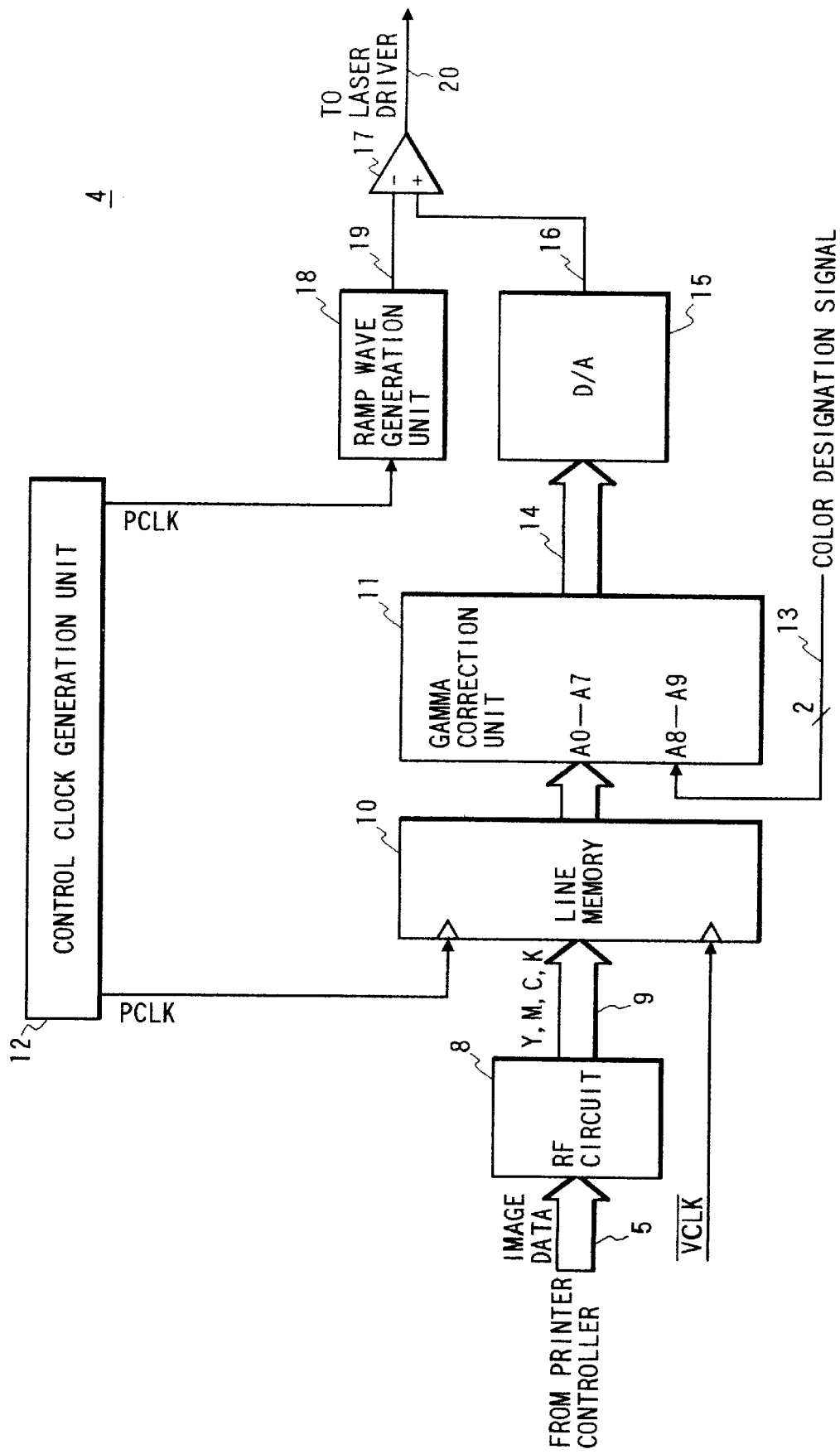

| A10 A9 A8 | |
|---|---|
| 0 0 0 | REGISTER SETTING VALUE 1 |
| 0 0 1 | REGISTER SETTING VALUE 2 |
| 0 1 0 | BLACK-AND-WHITE MODE |
| 0 1 1 | BLACK EXTRACTION |
| 1 0 0 | UCR TABLE (M) |
| 1 0 1 | UCR TABLE (C) |
| 1 1 0 | UCR TABLE (Y) |
| 1 1 1 | UCR TABLE (K) |

32

ADDRESS MAP OF ROM

MAGENTA CONVERSION TABLE

CYAN CONVERSION TABLE

YELLOW CONVERSION TABLE

BLACK CONVERSION TABLE

NOTE THAT IN FIGS. 10A TO 10D, BOTH INPUT G AND INPUT B DATA ARE $FF_H$

ONE DOT OF 600dpi

| A10 | A9 | A8 | A7 | A6 | A5 | A4 | A3 | A2 | A1 | A0 | |
|---|---|---|---|---|---|---|---|---|---|---|---|
| 0 | 0 | 0 | 0 | 0 | 0 | 0 | 0 | 0 | 0 | 0 | M COLOR 600 LINES |
| 0 | 0 | 1 | 0 | 0 | 0 | 0 | 0 | 0 | 0 | 0 | C COLOR 600 LINES |
| 0 | 1 | 0 | 0 | 0 | 0 | 0 | 0 | 0 | 0 | 0 | Y COLOR 600 LINES |
| 0 | 1 | 1 | 0 | 0 | 0 | 0 | 0 | 0 | 0 | 0 | Bk COLOR 600 LINES |
| 1 | 0 | 0 | 0 | 0 | 0 | 0 | 0 | 0 | 0 | 0 | M COLOR 200 LINES |
| 1 | 0 | 1 | 0 | 0 | 0 | 0 | 0 | 0 | 0 | 0 | C COLOR 200 LINES |
| 1 | 1 | 0 | 0 | 0 | 0 | 0 | 0 | 0 | 0 | 0 | Y COLOR 200 LINES |
| 1 | 1 | 1 | 0 | 0 | 0 | 0 | 0 | 0 | 0 | 0 | Bk COLOR 200 LINES |

FIG. 24

| A10 A9 A8 A7 | A0 |
|---|---|
| 0 0 0 | REGISTER SETTING VALUE 1 |
| 0 0 1 | REGISTER SETTING VALUE 2 |
| 0 1 0 | BLACK-AND-WHITE MODE |
| 0 1 1 | BLACK EXTRACTION |
| 1 0 0 | UCR TABLE (M) |
| 1 0 1 | UCR TABLE (C) |
| 1 1 0 | UCR TABLE (Y) |
| 1 1 1 | UCR TABLE (K) |

| M | MAGENTA TONER |
| C | CYAN TONER |
| Y | YELLOW TONER |
| K | BLACK TONER |

IMAGE PROCESSING APPARATUS AND METHOD WHICH PREVENTS THE GENERATION OF A WHITE STRIPE ON AN OUTPUT IMAGE

BACKGROUND OF THE INVENTION

1. Field of the Invention

The present invention relates to image processing apparatus and method for conducting color correction.

2. Related Background Art

In a prior art color image forming apparatus, a process of transferring a record image formed on a photoconductor drum by charging, light exposure and development is repeated for a plurality of colors to form a color image.

FIG. 38 shows a construction of a prior art color image forming apparatus.

In FIG. 38, a roller charger 102, a cleaning device 103, a developing device 104 and a transfer drum 105 are arranged around a photoconductor drum 101.

The developing device 104 is formed in a rotatable cylinder shape and four developing units 106a, 106b, 106c and 106d are provided therein and yellow, magenta, cyan and black toners are contained in the respective developing units 106a to 106d.

FIG. 39 shows a construction of the developing unit 106 (106a to 106d) and an application roller 107, a developing roller 108, a toner restriction member 109 and a toner container 110 are provided therein. As shown in FIG. 38, the developing roller 108 is exposed to the external from openings 111a to 111d of the developing units 106a to 106d. The application roller 107 is rotated to apply the toner contained in the toner container 110 to the developing roller 108, and necessary toribo is applied to the toner by the toner restriction member 109.

The transfer drum 105 comprises a resilient layer 113 on a metal cylinder 112 and a PVDF 114 on the resilient layer 113. A sheet feed roller 115, a gripper 116, a suction roller 117, a separation pawl 118, a fixing device 119, a cleaning device 120 and a discharging roller 121 are arranged around the transfer drum 105.

An optical unit 122 and a reflection mirror 123 are arranged above the photoconductor drum 101. The optical unit 122 comprises a laser diode, a laser driver, a rotating polygon mirror which is rotated at a high speed and a lens.

A sheet cassette 123 for containing transfer sheets, not shown, is arranged below the photoconductor drum 101.

The photoconductor drum 101 is driven in a direction a at a peripheral velocity of 100 min/sec by drive means, not shown. The photoconductor drum 101 has a photoconductor of organic photoconductor (OPC) material applied on an outer periphery of an aluminum cylinder having a diameter of 40 mm. A-Si, CdS or Se may be used as the OPC.

The material of the toner restriction member 109 is nylon when the toner is charged negatively, and silicone rubber when the toner is charged positively such that a material which is charged in the opposite polarity to that of the toner is used. A peripheral velocity of the application roller 107 is selected within a range of 1.0 to 2.0 times of the peripheral velocity of the photoconductor drum 101.

The transfer drum 105 has a resilient layer 113 of foamed urethane having a thickness of 2 mm wrapped on a metal cylinder 112 having a diameter of 156 mm and a PVDF 114 having a thickness of 100 µm is wrapped thereon.

A prior art color image forming apparatus is disclosed in Laid-open Japanese Patent Application No. 50-50935. The developing device 104 is disclosed in Laid-open Japanese Patent Application No. 50-93437.

An operation in the above construction is now explained.

When the laser diode in the optical unit 122 is driven by a yellow image signal through the laser driver, the laser beam illuminates the photoconductor drum 101 through the reflection mirror 123.

An AC voltage of 1500 V peak-to-peak at a frequency of 1000 Hz is superimposed on a DC voltage of −700 V and the surface of the photoconductor drum 101 is uniformly charged to approximately −700 V. The illuminated area of the photoconductor drum 101 is at approximately −100 V and an electrostatic latent image is formed. As the photoconductor drum 101 is advance along the arrow a, the toner is deposited to the electrostatic latent image by the developing device 106a containing the yellow toner so that it is visualized.

On the other hand, a transfer sheet (not shown) fed from the sheet cassette 123 by the sheet feed roller 115 is held by a gripper 116 and then electrostatically sucked to the transfer drum 105 by the suction roller 117 to which the voltage is applied. The toner image on the photoconductor drum 101 is transferred to the transfer sheet sucked to the transfer drum 105 by the voltage applied to the transfer drum 105 from a power supply, not shown.

The above process is repeated for the respective colors of magenta, cyan and black to form multi-color toner images superimposed on the transfer sheet. The transfer sheet is scraped off the transfer drum 106 by the separation pawl 110 and then fused and fixed by the fixing device by heating and pressurizing to form a full color image.

The remaining non-transferred toners on the photoconductor drum 101 are cleaned by the cleaning device 103 including a fur brush and blade means. The photoconductor drum 101 is discharged by the discharging device and initialized. In the present example, the charging roller 102 is used for the charging of the photoconductor drum 101, and when the photoconductor drum 101 is discharged, the DC voltage is set to approximately 0 V while keeping the applied AC voltage as is.

The toners on the transfer drum 105 are also cleaned by the cleaning device 120 including the fur brush and the web. The transfer drum 105 is discharged by the discharging roller 121 and initialized.

The developing method is preferably a one-component developing system which does not require a complex construction such as an ATR or a screw and allows the use of a process cartridge system which enhances user maintenance. Of the one-component development system, a non-contact development system offers an advantage of simple construction.

The color image forming apparatus described above is for a contact development system in which the developing roller 108 and the photoconductor drum contact so that one of them must be resilient. In the non-contact developing system, however, those members may be an aluminum substrate and hence a cost merit is high.

Further, since the color toner renders the tonality of the output image better, it is desirable to use a toner of the sharp melt type which is instantly molten at certain fixing temperature. However, this type of toner often lowers a glass transition point and in the contact developing system, toner may be fused to one or both of the photoconductor drum 101 and the developing roller 108 by the abrasion of the photoconductor drum 101 and the developing roller 108. In order to prevent the fusing, it is desirable to use the non-contact developing system.

FIG. 40 shows a non-contact developing system in which four developing devices 202a, 202b, 202c and 202d are fixedly arranged around the photoconductor drum 101 and a color image may be formed without contact between the photoconductor drum 101 and the developing devices 202a to 202d.

When a color image is formed by using the above non-contact developing system, the inventors of the present invention found that a white clearance which should not be present was created between colors of the image formed by different adjacent colors and a white stripe was created as shown in FIG. 41. This is caused because the visualized image is formed narrower than the electrostatic latent image formed on the photoconductor drum when the latent image, for example, the image edge at which a drum surface potential abruptly changes is formed on the photoconductor drum and developed by the developing device. In monochromatic image formation, the narrowing of the image, even if it occurs to some extent, does not cause a problem because there is no adjacent color.

However, when a color image is formed under such a condition and a cyan band and a black band, for example, are adjacent in the image, the image in which the cyan band and the black band should appear adjacently includes a clearance between the cyan band and the black band in the final image on the transfer sheet because the visualized cyan image and the visualized black image are narrowed respectively.

As shown in FIG. 42, such narrowing of the image is a phenomenon caused by the narrowing of the edge as shown by the visualized area because the electric field is wrapped at the edge (shown as the latent image area) of the electrostatic latent image formed on the photoconductor drum, and the affect appears more prominently in the non-contact developing system.

The present invention is intended to solve the above problems and it is an object of the present invention to provide a color image forming apparatus which eliminates the narrowing of the image.

In order to achieve the above object, the present invention provides an image processing apparatus for color-correcting image data for outputting to an image forming means, comprising input means for inputting image data; discrimination means for determining whether or not the image data is of a predetermined color; color correction means for color-correcting the image data even if the image data is lower than a predetermined level in such a manner that a light emitting device in the image forming means emits a light at a small light emission level; and output means for outputting the color-corrected image data or image data generally representing white to the image forming means based on the result of the determination.

It is other object of the present invention to prevent the narrowing of the image without causing a fogging phenomenon in a non-print area.

In order to achieve the above object, the present invention provides an image processing apparatus comprising input means for inputting color image data; edge detection means for detecting an edge based on the input color image data; and control means for controlling a light emitting device in an image forming unit to emit light at a small emission level for pixels near the edge.

Other objects and features of the present invention will be apparent from the following description of the embodiments and the accompanying drawings.

BRIEF DESCRIPTION OF THE DRAWINGS

FIGS. 2A and 2B show waveforms of potentials on a photoconductor drum to illustrate a principle of the present invention;

FIG. 3 shows a block diagram of a system of the Embodiment 1;

FIG. 4 shows a block diagram of a configuration of a printer controller;

FIG. 5 shows a block diagram of a configuration of a printer engine;

FIG. 9 shows an address map of a ROM of FIG. 8;

FIG. 22 shows a LUT of a gamma correction unit;

FIG. 24 shows a configuration of a ROM of the RF circuit;

DETAILED DESCRIPTION OF THE PREFERRED EMBODIMENTS

[Embodiment 1]

Figure 1:
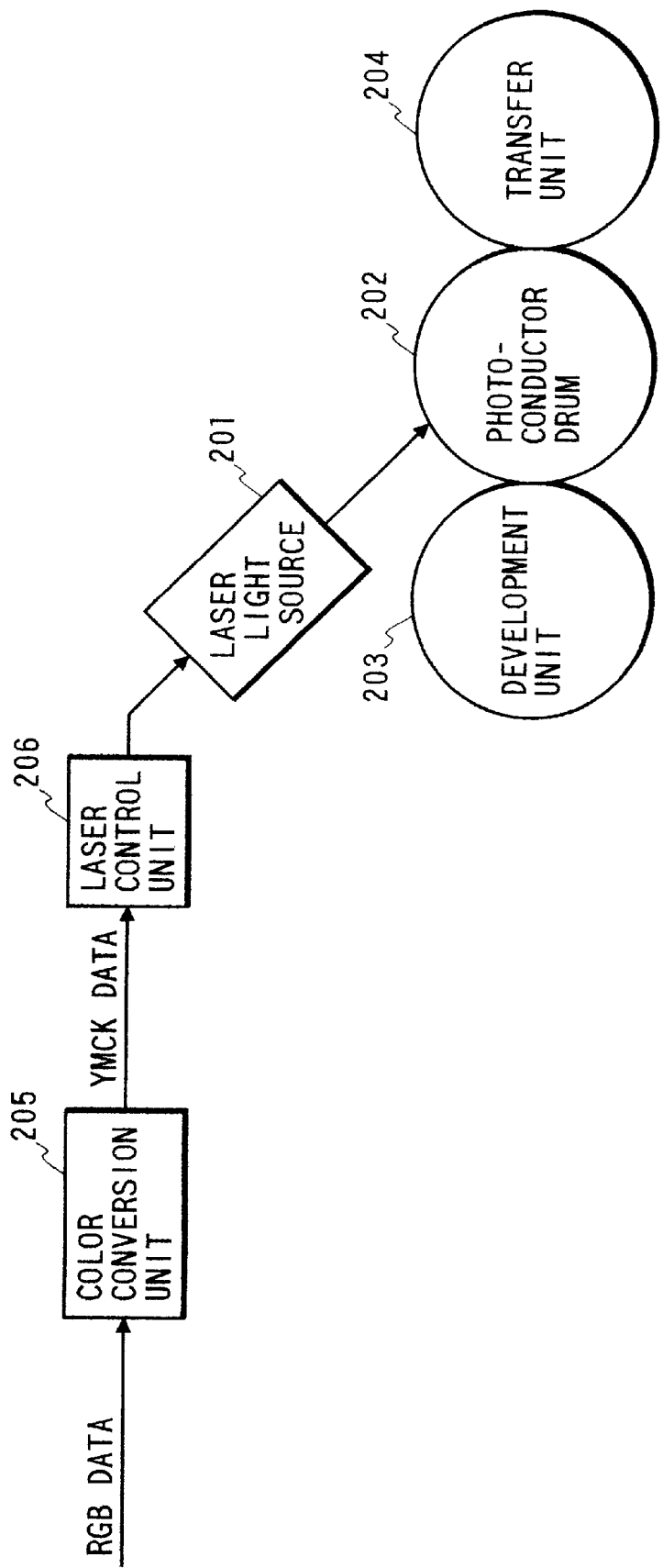
FIG. 1 shows a block diagram of an Embodiment 1.

FIG. 1 shows a block diagram of an image processing apparatus of an Embodiment 1.

In FIG. 1, numeral 201 denotes a laser light source for generating a laser beam, numeral 202 denotes a photoconductor drum on which an electronic latent image is formed by directing the laser beam from the laser light source, numeral 203 denotes developing means for depositing toner on the photoconductor drum to develop the latent image to form a toner image, and numeral 204 denotes transfer means for transferring the toner image to a transfer sheet.

Numeral 205 denotes color conversion means for converting RGB image data to YMCK (yellow, magenta, cyan and black) image signal and numeral 206 denotes laser control means for producing a laser control signal for controlling the light emission of the laser light source 201 in accordance with the YMCK image signal.

An operation is now explained.

The input RGB image signal is converted to the YMCK image signal by the color conversion means 205. The laser control means 206 controls the light emission of the laser light source 201 in accordance with the YMCK image signal.

The photoconductor drum 201 is illuminated by the laser beam to form an electronic latent image thereon and the developing means 203 deposits toners on the photoconductor drum 201 to form a toner image. The toner image is transferred to the transfer sheet by the transfer means 204.

The above operation is conducted for each color of YMCK so that a color image is formed on the transfer sheet.

A YMCK image signal which relieves an electric field wrapping phenomenon which causes an edge narrowing phenomenon is created by the color conversion means 205 in accordance with the input RGB image signal.

A concept of the method for relieving the electric field wrapping phenomenon is described below.

FIGS. 2A and 2B show surface potentials on the photoconductor drum 202.

FIG. 2A shows a surface potential in prior art image formation. A potential in a print area is set to approximately −100 V and a potential in a non-print area is set to −700 V. FIG. 2B shows a surface potential in the image formation by the present invention. A potential in the print area is set to −100 V and a potential in the non-print area is set to −700 V. In the condition of FIG. 2A, the potential abruptly changes at a boundary (point A) of the print area and the non-print area as described above so that strong wrapping of the electric field occurs. By directing fine laser emission to the non-print area as shown in FIG. 2B, the change of the potential at the boundary of the print area and the non-print area is stepwise and the wrapping of the electric field may be weakened. Accordingly, since the narrowing of the visualized image on the photoconductor drum in the non-contact developing system is prevented, the generation of a white stripe by the clearance created between different color areas is prevented.

When the laser light source 201 is operated in a fine light emission mode, it is effected within a range in which the surface potential of the photoconductor drum by the fine light emission does not affect the image quality of the color image.

FIG. 3 shows a block diagram of the Embodiment 1 of the present invention based on the above principle.

In FIG. 3, image information in a predetermined language derived from a host computer 1 as an external unit is received by a printer 2 as a color image forming apparatus. The printer 2 comprises a printer controller 3 and a printer engine 4.

The image information is received by the printer controller 3 which develops the image and sends the image data 5 to the printer engine 4. The printer engine 4 prints the data based on the image data 5 and forms a full color image on the transfer sheet.

In the following description, it is assumed that the image data 5 is multi-value image data representing 8-bit R (red), G (green) and B (blue) brilliance, respectively.

Major signals sent from the printer controller 3 to the printer engine 4 are the image data 5 (RDATA0 to RDATA7, GDATA0 to GDATA7 and BDATA0 to BDATA7), an image transfer clock (VCLK), a line sync signal (LSYNC) and a page sync signal (PSYNC). It is assumed that the printer engine 4 prints at a resolution of 600 dpi (dots per inch).

FIG. 4 shows a configuration of the printer controller 3.

The image signal sent from the host computer 1 is developed by an image developing unit 6 into R-G-B multi-value brilliance data and one page of data is temporarily stored in an image memory 7 and then the image data is read and transferred to the printer engine 4.

FIG. 5 shows a configuration of a signal processing unit of the printer engine 4.

The R, G, B image data sent from the printer engine 4 is color-converted to magenta (M), cyan (C), yellow (Y) and black (K) by an RF (reproduction function) circuit 8 and is outputted as field sequential image data 9 in the order of M, C, Y and K. The image data 9 is written into a line memory 10 by an image transfer clock VCLK and then read by a clock PCLK and sent to a gamma correction unit 11. The clock PCLK is generated by a control clock generation unit 12.

Figure 6:
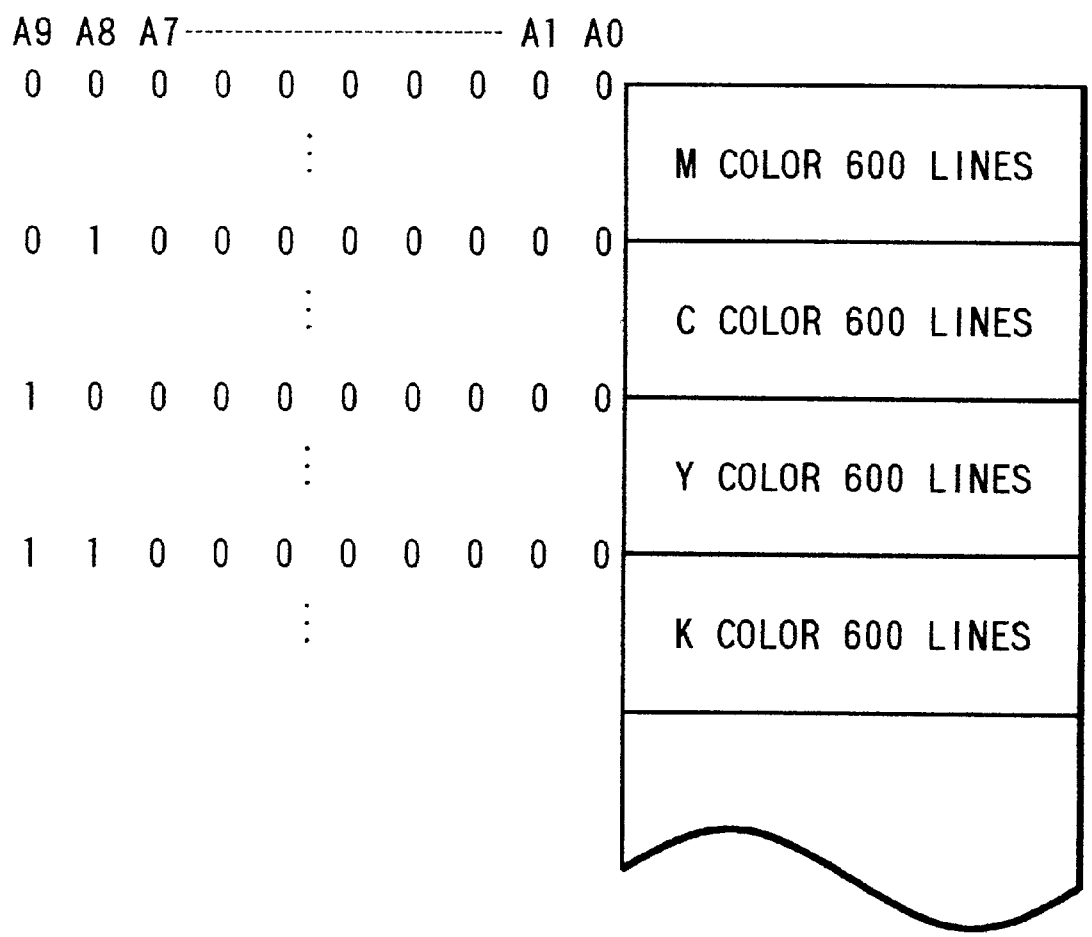
FIG. 6 shows a correction table of a gamma correction unit.

The gamma correction unit 11 comprises a gamma correction table as a look-up table (LUT) formed by a RAM or a ROM and the read image data 9 is inputted to addresses A0 to A7 and a color designation signal 13 is inputted to A8 and A9. An address map of the gamma correction table is shown in FIG. 6. As shown in FIG. 6, the gamma correction conducts different corrections depending on the colors of the toners.

Thus, the gamma correction table is set in accordance with a process conducted in the RF circuit 8 to be described later.

Figure 7:
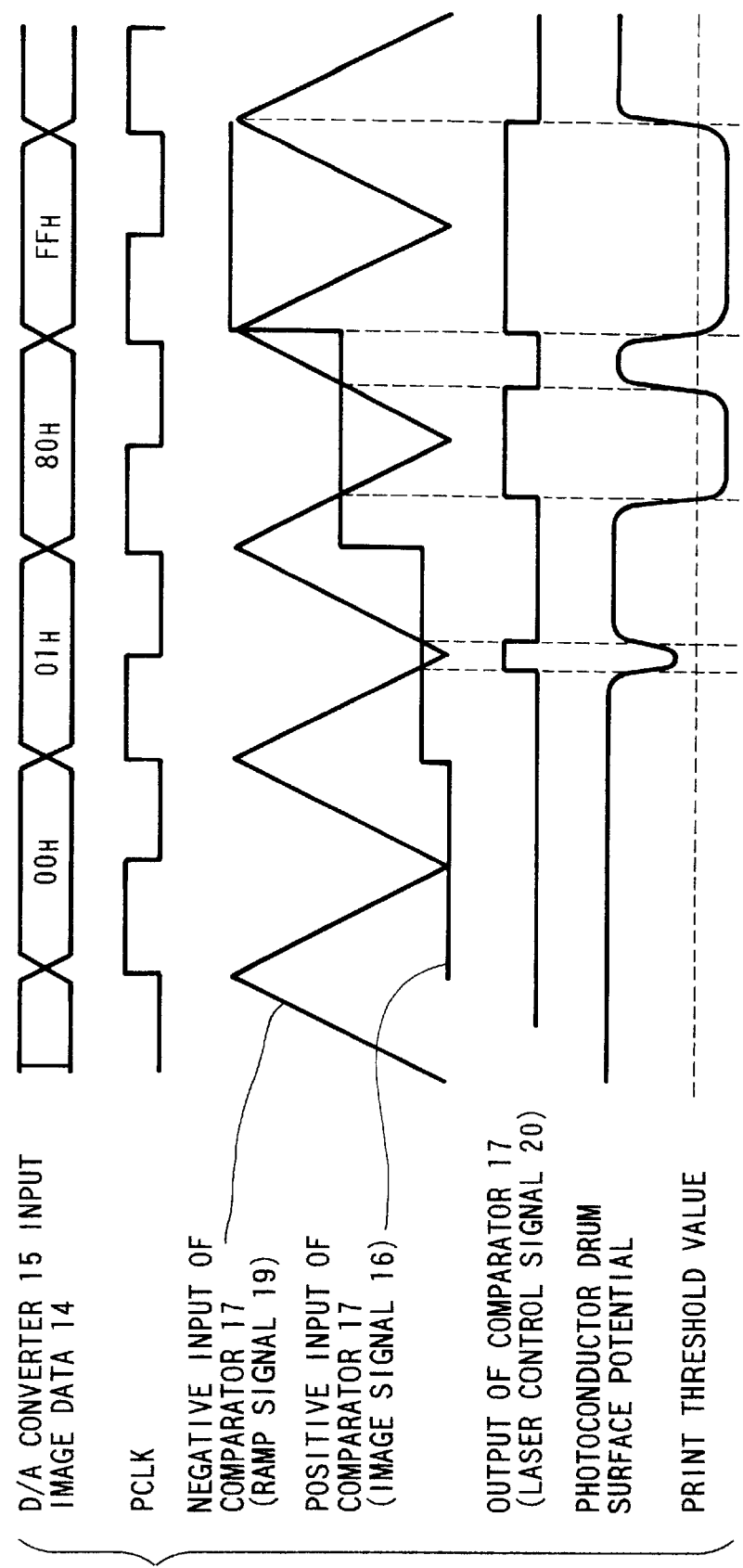
FIG. 7 shows a timing chart of an operation of the circuit of FIG. 5.

The gamma-corrected image data as shown in FIG. 7 is converted to an analog signal 16 by a D/A converter 15 and is inputted to a positive input of a comparator 17. A ramp signal 19 shown in FIG. 7 which is generated by a ramp wave generator 18 in synchronism with the clock PCLK is inputted to a negative input of the comparator 17.

The comparator 17 compares the image signal 16 with the ramp signal 19 to output a laser control signal 20 which is PWM-modulated as shown in FIG. 7. The laser control signal 20 controls the light emission of the laser diode through the laser driver so that the potential on the surface of the photoconductor drum changes with the pulse width of the laser control signal 20 as shown in FIG. 7.

The printing is conducted in areas in which the surface potential of the photoconductor drum exceeds a predetermined print threshold. In the example of FIG. 7, when the image data 14 is $00_H$ and $01_H$, the pulse width of the laser control signal 20 is narrow and the illumination time of the laser beam to the photoconductor drum is short so that the surface potential does not exceed the print threshold and the printing is not conducted. Namely, the toner image is not formed on the transfer sheet. When the image data 14 is $80_H$ and $FF_H$, the pulse width is wide and the illumination time of the laser beam is long so that the surface potential exceeds the print threshold and the toner image is formed on the transfer sheet.

Figure 8:
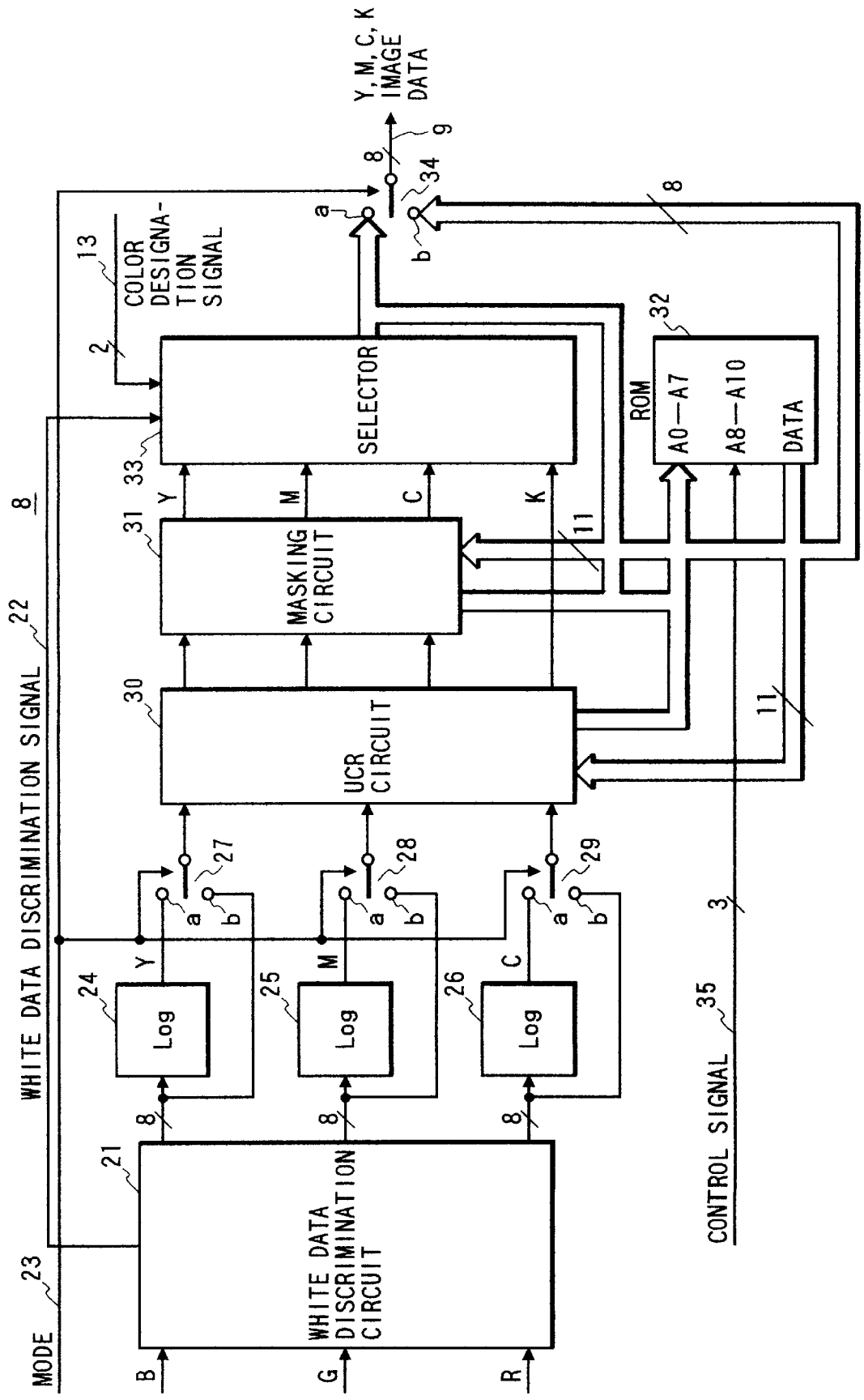
FIG. 8 shows a block diagram of a configuration of an RF circuit of FIG. 5.

FIG. 8 shows a configuration of the RF circuit 8.

In FIG. 8, numeral 21 denotes a white data discrimination circuit for determining whether or not the input RGB image data 5 is white to produce a white data discrimination signal 22, numerals 24, 25 and 26 denote ROMs having logarithmic conversion LUTs, numerals 27, 28, 29 and 34 denote switches controlled by a mode selection signal (MODE) 23, numeral 30 denotes a UCR (under color removal) circuit, numeral 31 denotes a masking circuit including a product sum circuit and numeral 32 denotes a ROM having a LUT of masking coefficients and UCR coefficients. An address map thereof is shown in FIG. 9. Numeral 33 denotes a selector and numeral 35 denotes a control signal.

Figure 11:
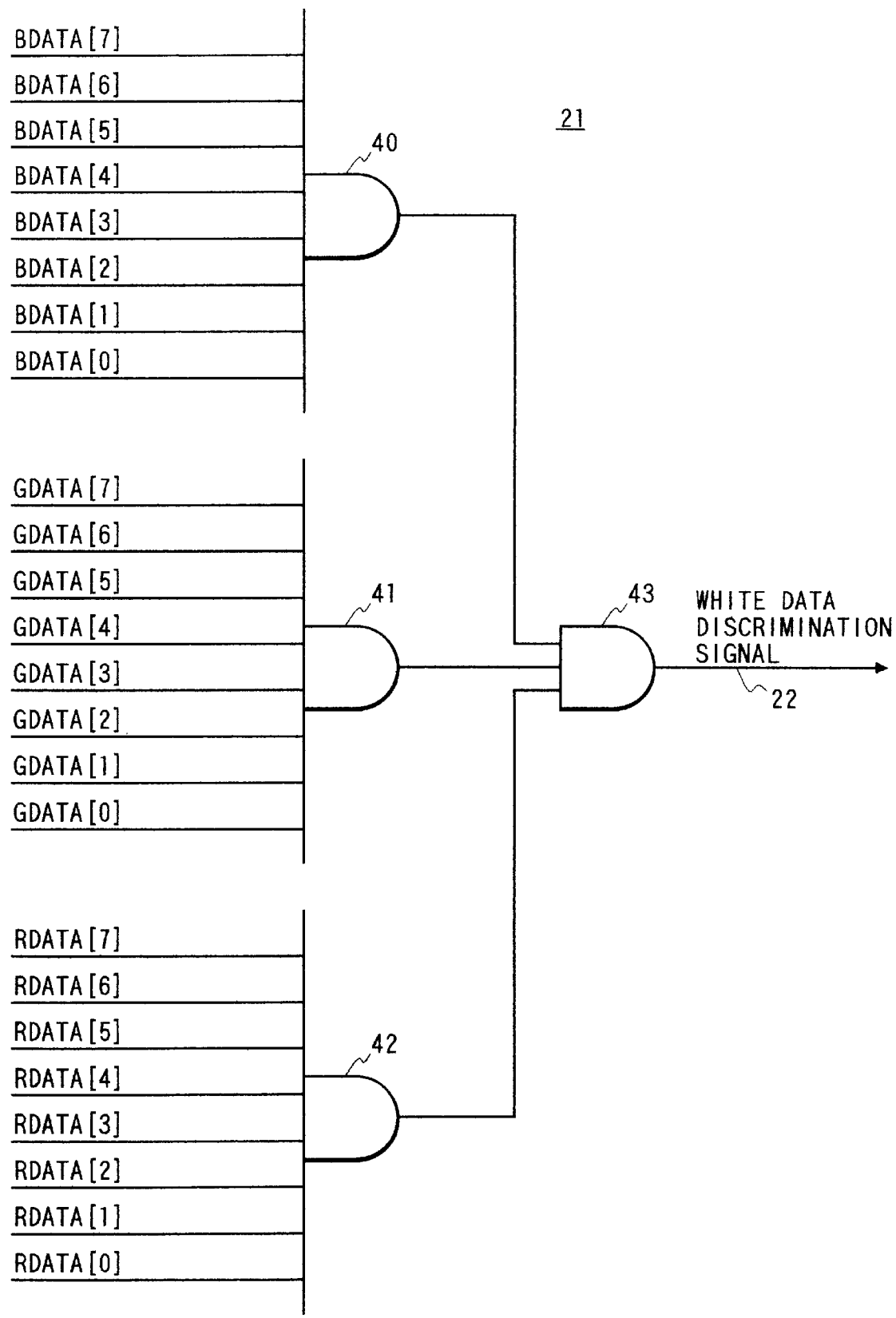
FIG. 11 shows a circuit diagram of a configuration of a white data discrimination circuit.

FIG. 11 shows a configuration of the white data discrimination circuit 21.

In this circuit, 8-bit B, G and R bits are inputted to multi-input AND gates 40, 41 and 42, respectively, to detect $B=FF_H$, $G=FF_H$ and $R=FF_H$, respectively, and the respective AND outputs are inputted to an AND gate 43 to output the white data discrimination signal 22 which assumes a H (high) level for the white data.

Figure 12:
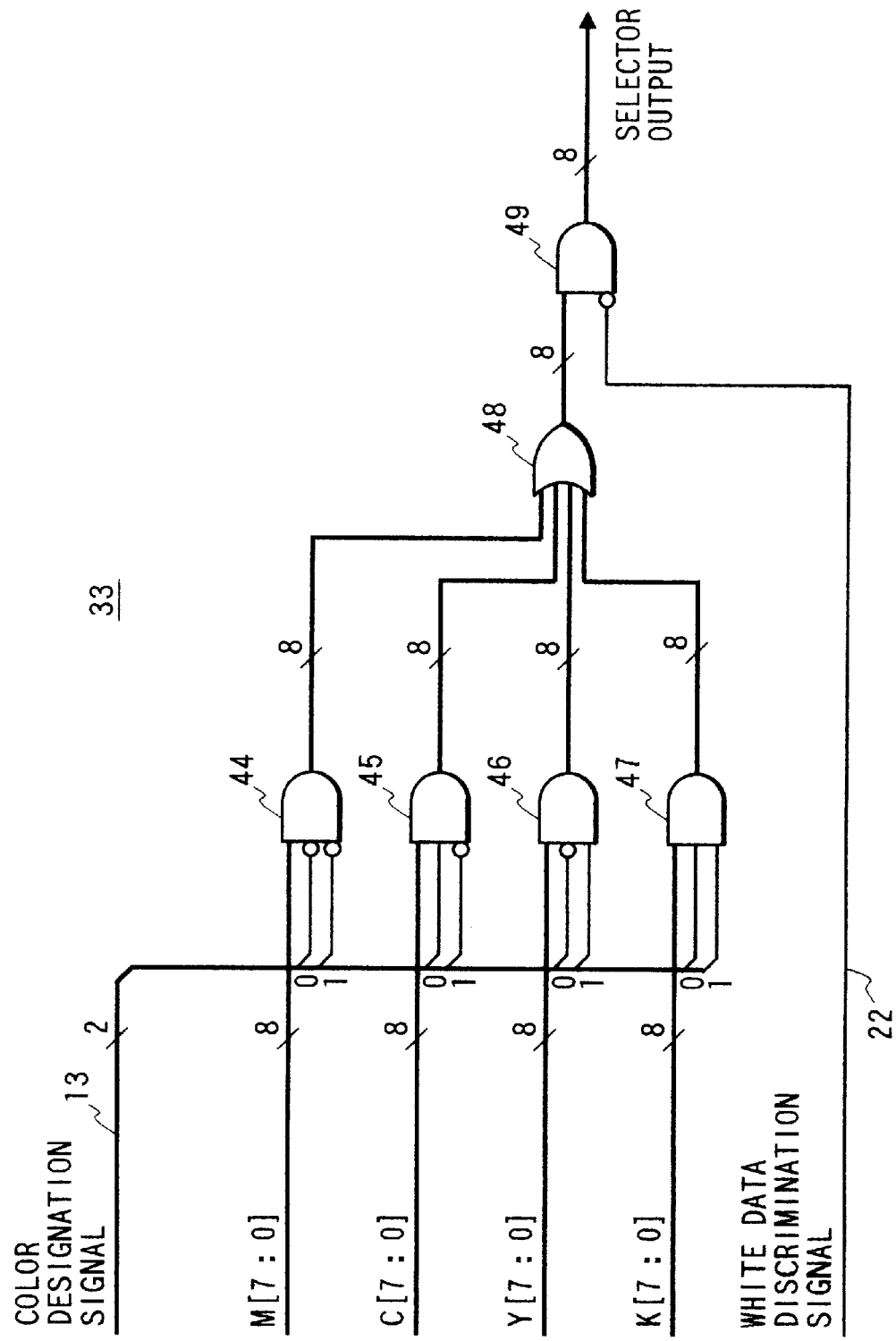
FIG. 12 shows a circuit diagram of a configuration of a selector.

FIG. 12 shows a configuration of the selector 33.

This circuit comprises AND gates 44 to 47 and 49 and an OR gate 48 as shown. When the white data discrimination circuit 21 discriminates the white data, the YMCK data is outputted as $00_H$ without regard to the YMCK image signal inputted to the selector 23.

On the other hand, when the white data discrimination circuit 21 discriminates color data, the YMCK image signal inputted to the selector 33 corresponding to the color designation signal is outputted.

An operation when the white data discrimination circuit 21 discriminates data other than white data is now specifically explained. It is assumed that the switches 27, 28, 29 and 34 are closed to the position a of the color mode by the MODE signal 23. The 8-bit R, G and B image data 5 outputted by the printer controller is logarithmically controlled by the LUTs stored in the ROMs 24, 25 and 26 so that blue (B) is density-converted to yellow (Y), green (G) to magenta (M) and red (R) to cyan (C), respectively, and are inputted to the UCR circuit 30 through the switches 27, 28 and 29, respectively.

When a control signal 35 of '100' is inputted, it is sent to A8 to A10 of the ROM 32 shown in FIG. 9 to select the magenta (M) UCR table, and the UCR circuit 30 detects a minimum value of the input Y, M and C 8-bit data. The detected minimum value is sent to A0 to A7 of the ROM 32 to address it and the magenta (M) UCR data corresponding to the input data is outputted from DATA.

When the control signal 35 of '000' is inputted, it is sent to A8 to A10 of the ROM 32 to set a bank and the address data is sent from the register of the masking circuit 31 to A0 to A7 of the ROM 32 so that the ROM 32 sets the addressed magenta (M) masking coefficient data to the masking circuit 31. The magenta (M) image data outputted from the UCR circuit 30 is multiplied and summed with the masking coefficient set by the masking circuit 31 and the result is outputted to the selector 33. Then, the selector 33 is switched by the color designation signal 13 and the magenta (M) image data 9 is outputted to a succeeding stage through the switch 34.

When the above operation is completed for one field, the control signal 35 of '101' is then sent to A8 to A10 of the ROM 32 to select the cyan (C) UCR table, and a minimum value of Y, M and C is detected by the UCR circuit 30 and is sent to A0 to A7 of the ROM 32 to address it, and the cyan (C) UCR data corresponding to the input data is outputted from DATA. Then, the control signal 35 of '000' is sent to A8 to A10 of the ROM 32, the address data is sent from the register of the masking circuit 31 to A0 to A7 of the ROM 32 and the ROM 32 sets the addressed cyan (C) masking coefficient data to the masking circuit 31. The cyan (C) image data outputted from the UCR circuit 30 is multiplied and summed with the masking coefficient set by the masking circuit 31 and the result is outputted to the selector 33. The selector 33 is then switched by the color designation signal 13 and the cyan (C) image data is outputted to the succeeding stage. This operation is conducted for one field of data.

Then, the control signal 35 of '110' is sent to A8 to A10 of the ROM 32 to select the yellow (Y) UCR table, the UCR circuit 30 detects a minimum value of Y, M and C and sends the minimum value to A0 to A7 of the ROM 32 to address it, and the yellow (Y) UCR data corresponding to the input data is outputted from DATA. Then, the control signal 35 of '000' is sent to A8 to A10 of the ROM 32 to set the bank, the address data is sent to A0 to A7 of the ROM 32 from the register of the masking circuit 31 and the ROM 32 sets the addressed yellow (Y) masking coefficient data to the masking circuit 31. The yellow (Y) image data outputted from the UCR circuit 30 is multiplied and summed with the masking coefficient set by the masking circuit 31 and the result is outputted to the selector 33. The selector 33 is switched by the color designation signal 13 and the yellow (Y) image data is outputted to the succeeding stage. This operation is conducted for one field of data.

Then, the control signal 35 of '111' is sent to A8 to A10 of the ROM 32 to select the black (K) UCR table, the UCR circuit 30 detects a minimum value of Y, M and C and sends the minimum value to A0 to A7 of the ROM 32 to address it and the black (K) UCR data corresponding to the input data is outputted from DATA. Then, the black (K) image data outputted from the UCR circuit 30 is outputted to the selector 33. The selector 33 is switched by the color designation signal 13 and the black (K) image data is outputted to the succeeding stage. This operation is conducted for one field of data.

By the four-step operation described above, one field of color conversion process is completed.

The UCR and masking coefficients for the Y, M, C and K colors used in the color mode are preset such that the Y, M, C and K image signals after color correction are larger than a predetermined value, $10_H$ in the illustrated example, without regard to the input RGB image signal.

When the image data is monochromatic, the switches 27, 28, 29 and 34 are connected to a position b by the MODE signal 23 so that the R, G and B image data is inputted to the UCR circuit 30 and directly inputted to the masking circuit 31. Then, the control signal 35 of '000' is sent to A8 to A10 of the ROM 32 to set the bank, the address data is sent from the register of the masking circuit 31 to A0 to A7 of the ROM 32 and the ROM 32 sets the addressed brilliance conversion coefficient data to the masking circuit 31. The image data is brilliance converted in the same manner as that for the color image and it is outputted from the selector 33. Then, the control signal 35 of '010' is sent to A8 to A10 of the ROM 32 to set the bank to the black-white mode, the data outputted from the selector 33 is sent to A0 to A7 of the ROM 32 to address it, and the logarithmically converted data corresponding to the input data is outputted from DATA. By this operation, the image in the black-white mode is outputted.

The logarithmic conversion data used in the monochromatic mode has been converted in accordance with the brilliance data level inputted to the ROM 32 unlike the data outputted from the ROMs 24, 25 and 26 in the color mode.

Referring to FIGS. 10A to 10D, a specific example of a process result by the RF circuit is explained.

FIGS. 10A to 10D show color conversion results to the YMCK data when G data=$FF_H$, B data=$FF_H$ and R data is $00_H$ to $FF_H$.

Figure 10A:
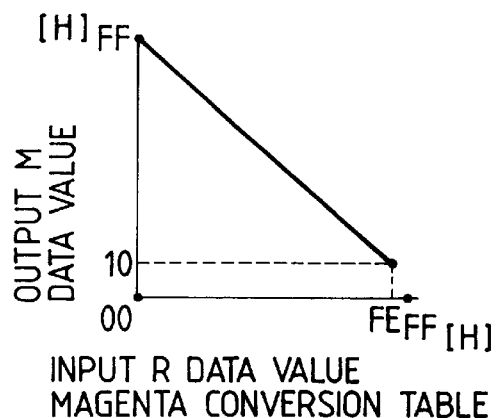
FIGS. 10A to 10D show graphs to illustrate color conversion.
Figure 10B:
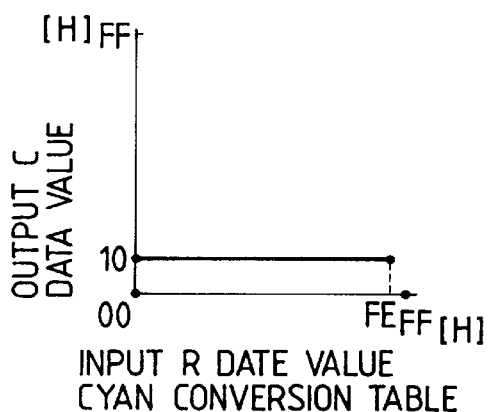
Figure 10C:
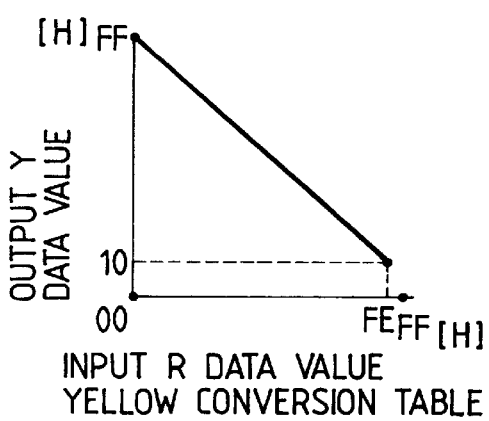
Figure 10D:
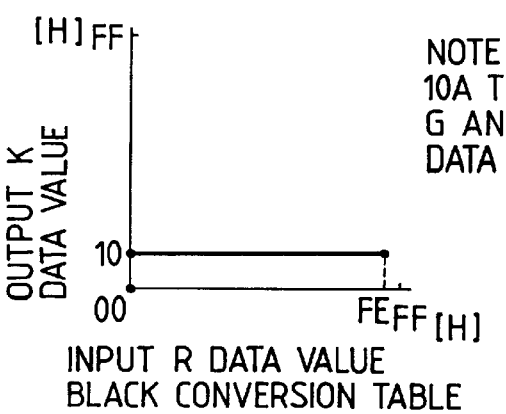

In FIG. 10A, when R=$FF_H$, it is discriminated as the white data and all YMCK data are set to $00_H$. When R=$FF_H$, it is discriminated as the non-white data and all YMCK data are set to $10_H$. Accordingly, the photoconductor drum is illuminated with a pulse width of the laser control signal 20 corresponding to $10_H$. As explained with reference to FIG. 7, since the pulse width for $10_H$ is narrow, the surface potential of the photoconductor drum is not changed to the extent that the toner is deposited. As a result, the surface potential of the photoconductor drum is slightly changed without affecting the tonality of the printed image so that the wrapping of the electric field described above is reduced and the narrowing of the visualized image on the photoconductor drum is prevented. Similarly in FIGS. 10B to 10D, when C, Y, K is $FF_H$ is discriminated as the white data and when C, Y, K is $FE_H$, it is discriminated as the non-white data and the laser control signal 20 by $10_H$ is outputted to prevent the narrowing of the visualized image.

Figure 13:
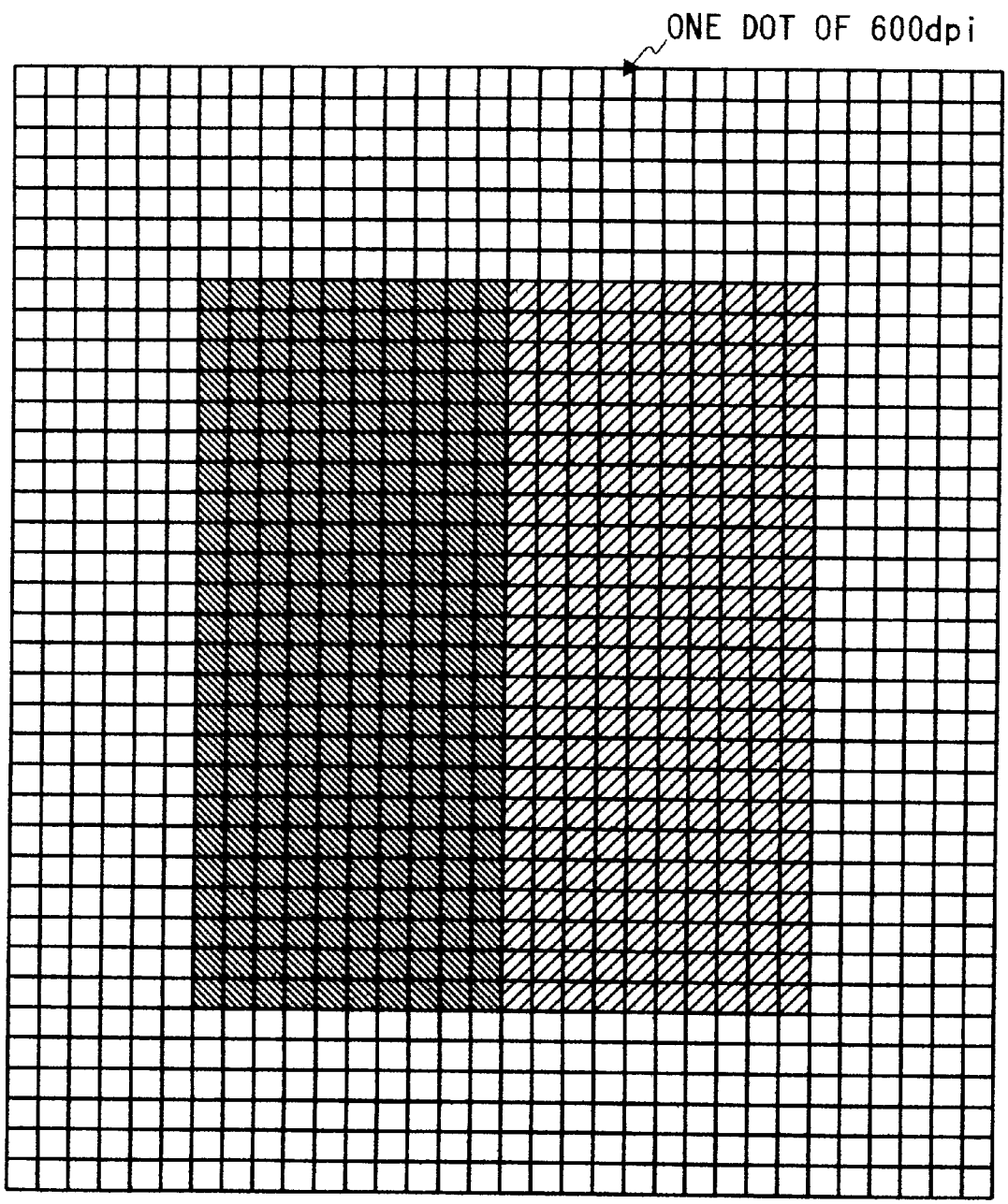
FIG. 13 shows RGB image data.
Figure 14:
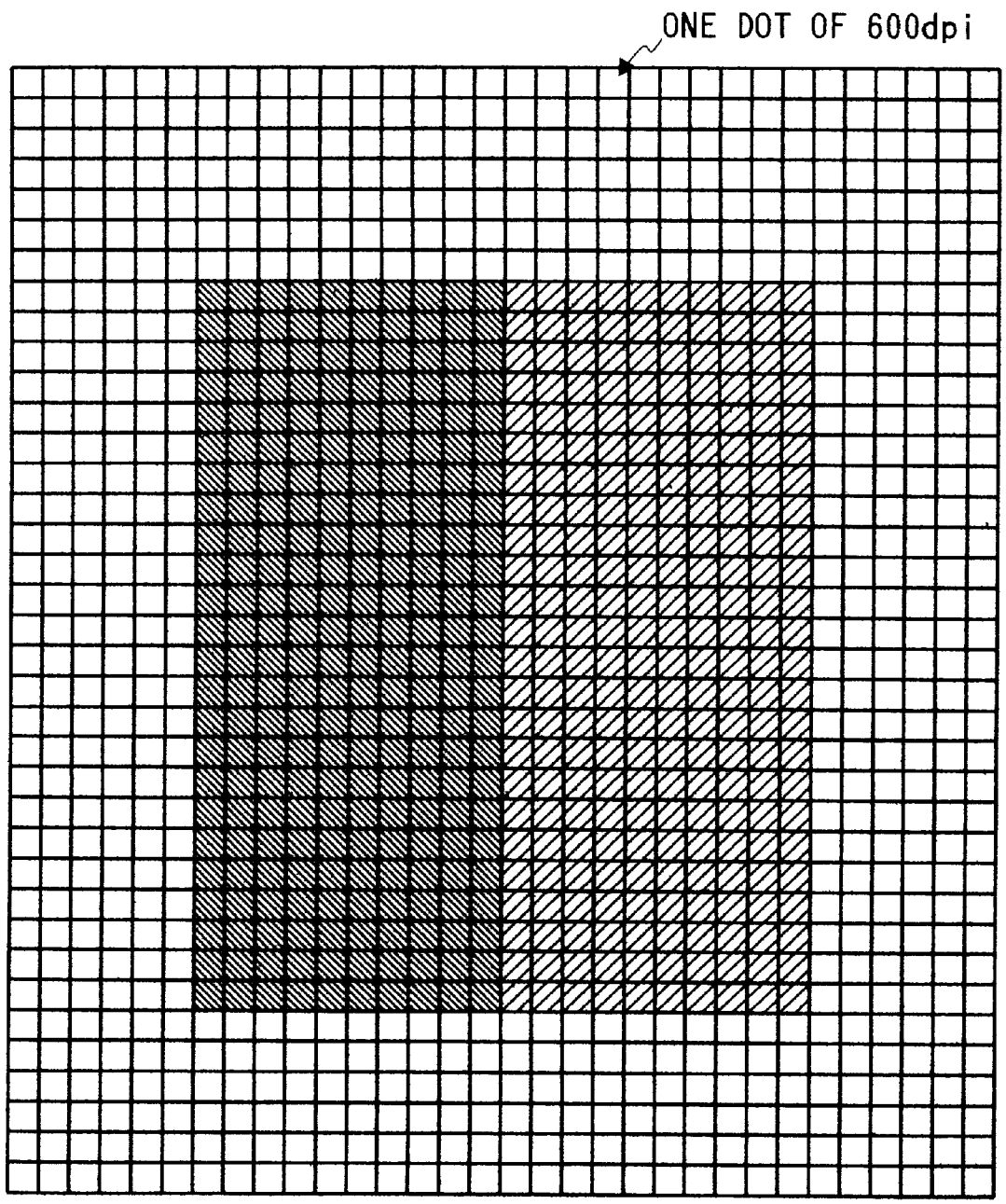
FIG. 14 shows YMCK image data.

FIG. 13 shows RGB image data and FIG. 14 shows YMCK image data converted from the RGB image data of FIG. 13. As shown in FIG. 14, when all of RGB are $FF_H$, it is discriminated as the white data and all of YMCK are set to $00_H$. When not all of RGB are $FF_H$, the RGB-YMCK conversion is conducted such that YMCK have high densities when they are above $10_H$ so that the laser weakly emits light for all of YMCK.

Figure 21:
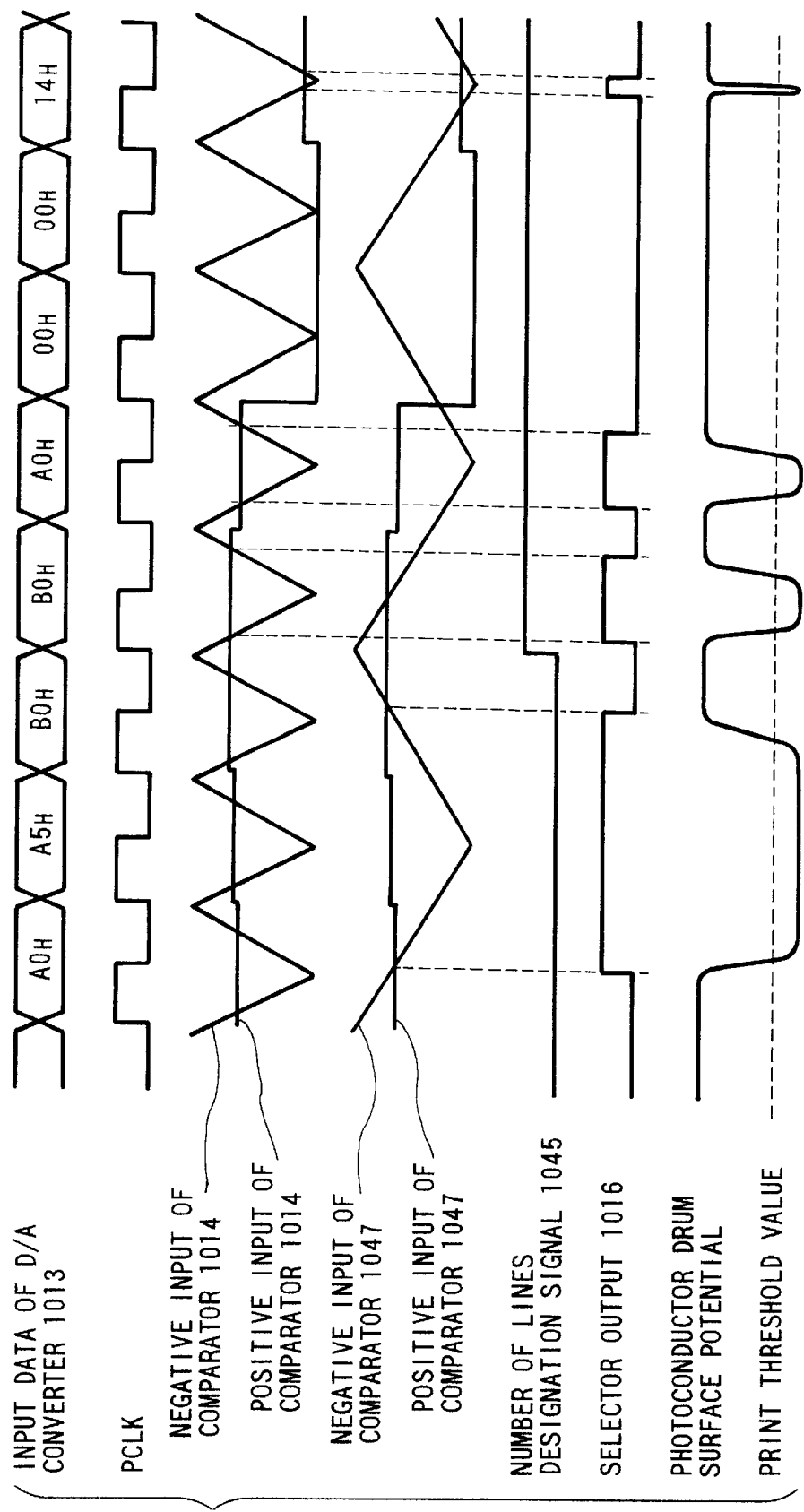
FIG. 21 shows a timing chart of signals of the printer engine.

In accordance with the present embodiment, the white stripe due to the clearance created between different color areas as shown in FIG. 21 which is caused by the narrowing of the edge is prevented and a high grade image is provided.

By providing the white data discrimination circuit 21 to differently process the white data and the non-white data, the processes appropriate for the respective data may be conducted. Namely, for the white data, even if the edge is narrowed, the white image area somewhat increases and it does not cause a significant problem. Rather, the enhancement of the edge which is the boundary of the white image area and the color image area may provide a high grade image.

[Modification]

In the above embodiment, the white data and the color data are discriminated and the process is changed depending on the discrimination result. The present invention is not limited thereto but the white data need not be discriminated and the above process may be uniformly conducted for the entire image data.

Figure 15:
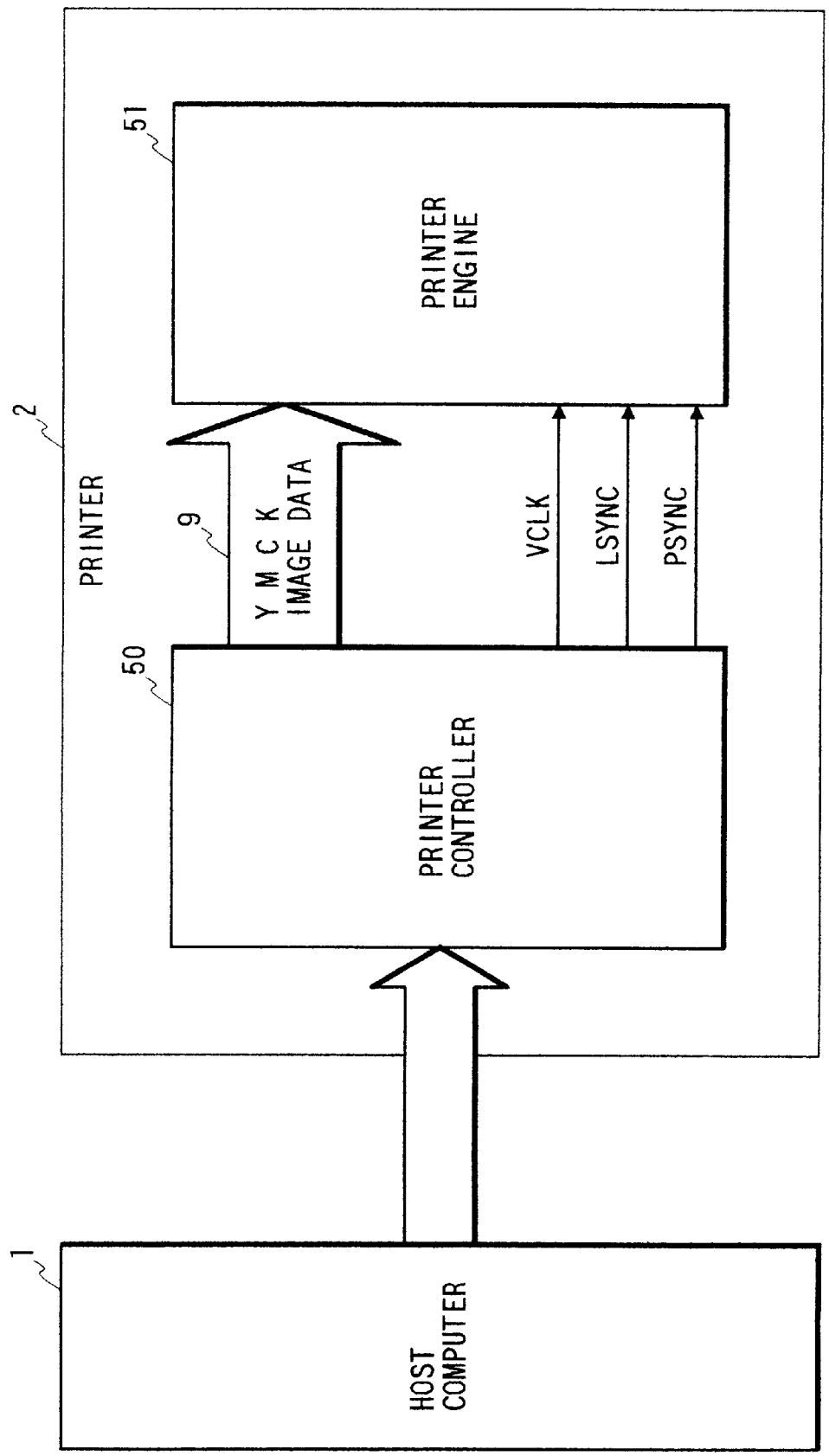
FIG. 15 shows a block diagram of an Embodiment 2.

The circuit may be configured as shown in FIG. 15.

In FIG. 15, the RF circuit 8 in the above embodiment is built in the printer controller 50. In the printer controller 50, the RGB brilliance signals are converted to the YMCK density signals and the YMCK image data 9 is sent to the printer engine 51.

Figure 16:
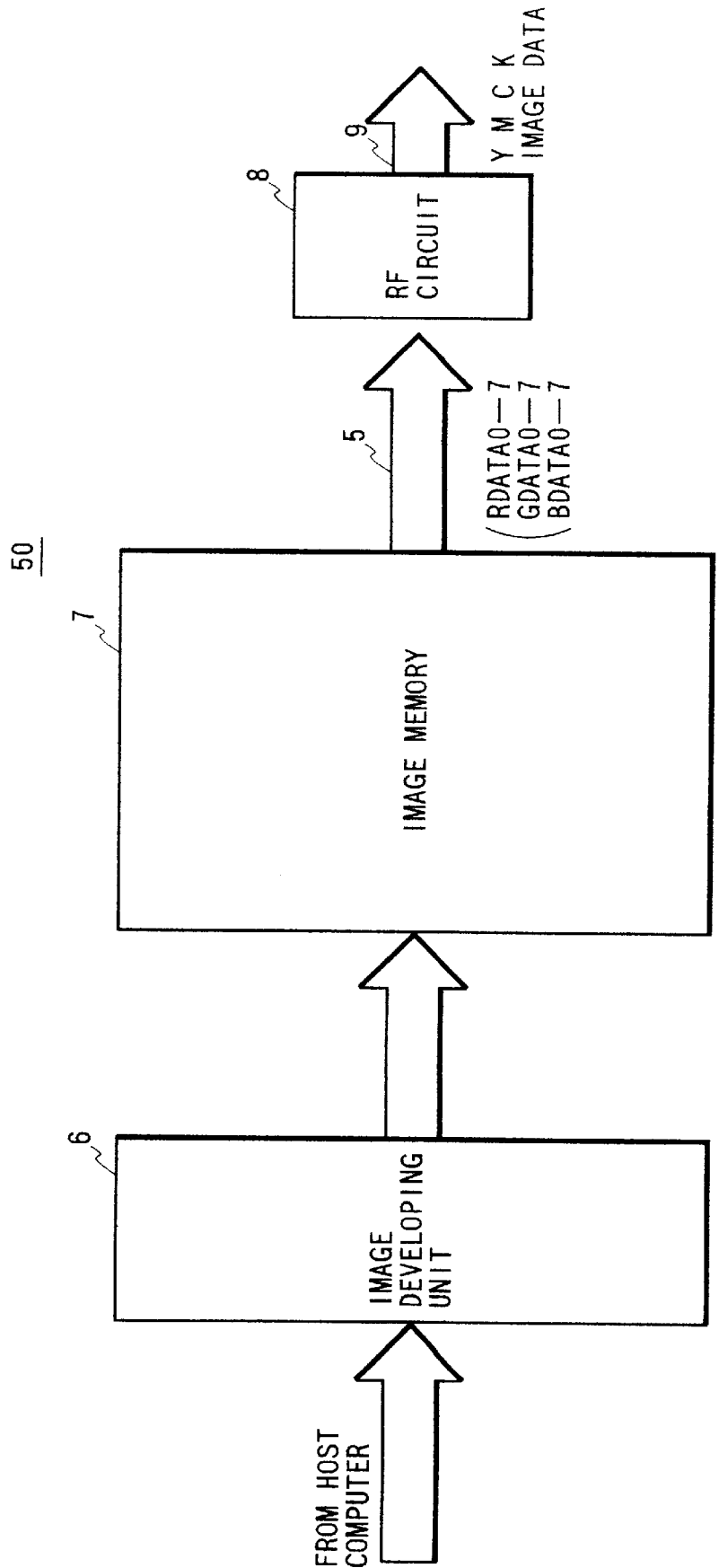
FIG. 16 shows a block diagram of a configuration of a printer controller of FIG. 15.

FIG. 16 shows a configuration of the printer controller 50.

In FIG. 16, the RF circuit receives the RDATA (7:0), the GDATA (7:0) and the BDATA (7:0) of the image data 5 sent from the image memory 7 and outputs the YMCK image data 9.

Figure 17:
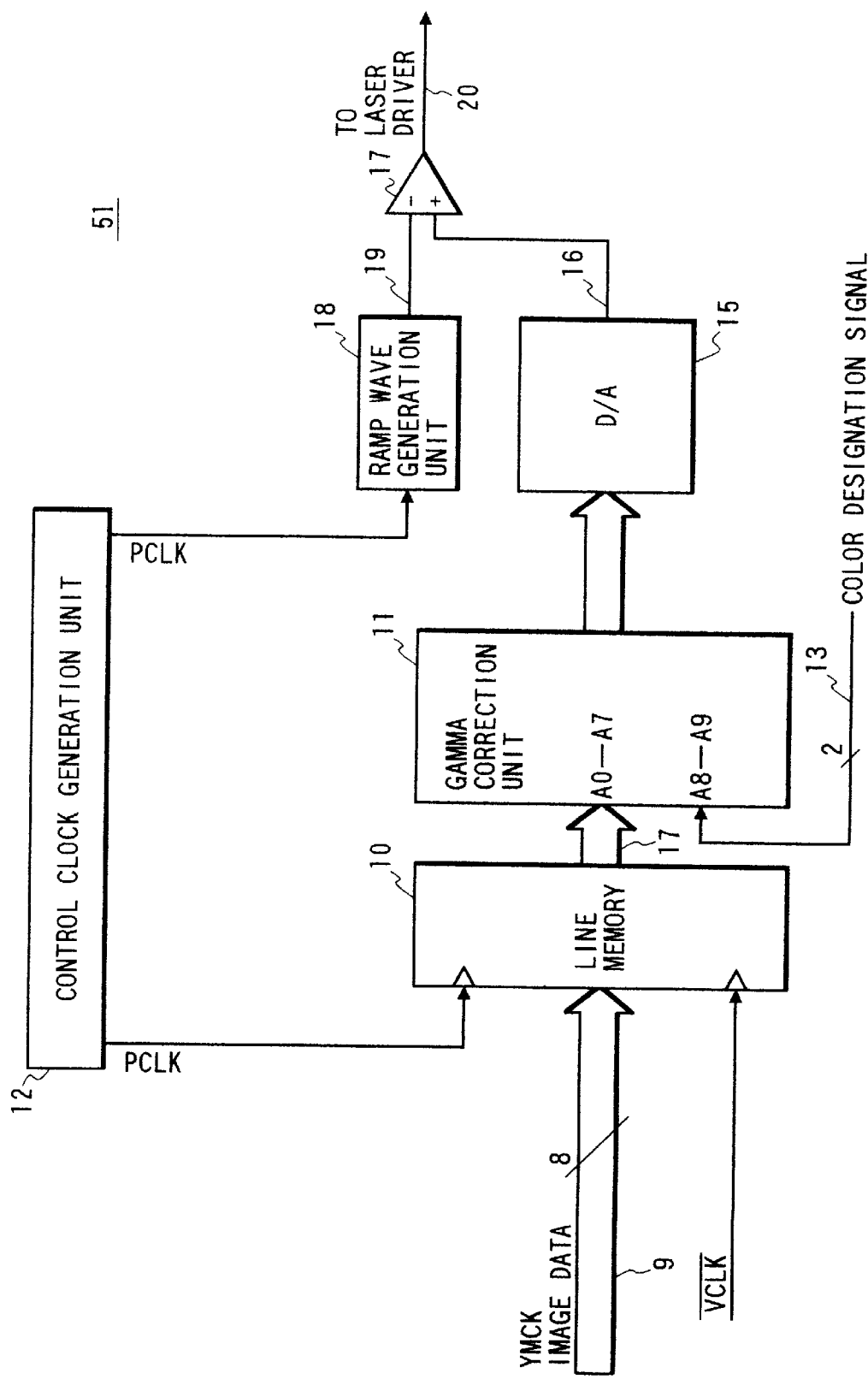
FIG. 17 shows a block diagram of a configuration of a printer engine.

The succeeding stage printer engine 51 receives the YMCK image data 9 and forms a color image in accordance with the received signal. FIG. 17 shows a configuration of the printer engine 51 in which the RF circuit 8 in FIG. 5 is omitted. The configuration of the RF circuit of FIG. 16 and the processing method are identical to those of the Embodiment 1.

An advantage of the present embodiment resides in that the number of image signal lines of the interface between the printer controller 50 and the printer engine 51 is eight compared with 24 in the Embodiment 1.

In accordance with the present embodiment, a narrowing of the image is prevented and the high grade image is outputted.

Further, the white stripe is prevented by the appropriate color correction based on the input image data and the edge at the boundary of the white image area and the color image area is kept so that the high grade image is outputted.

[Embodiment 2]

In the Embodiment 2, in order to relieve the electric field wrapping phenomenon, the charging potential to uniformly charge the drum surface is lowered. In accordance with the Embodiment 1, the narrowing of the visualized image may be reduced but the deposition of the toner to the non-print area or a so-called fogging phenomenon occurs and a sufficient image density may not be attained because the potential difference between the print area and the non-print area is small and those problems are to be resolved.

In the Embodiment 2, it is intended to prevent the narrowing of the image without causing the fogging phenomenon in the non-print area.

Figure 18:
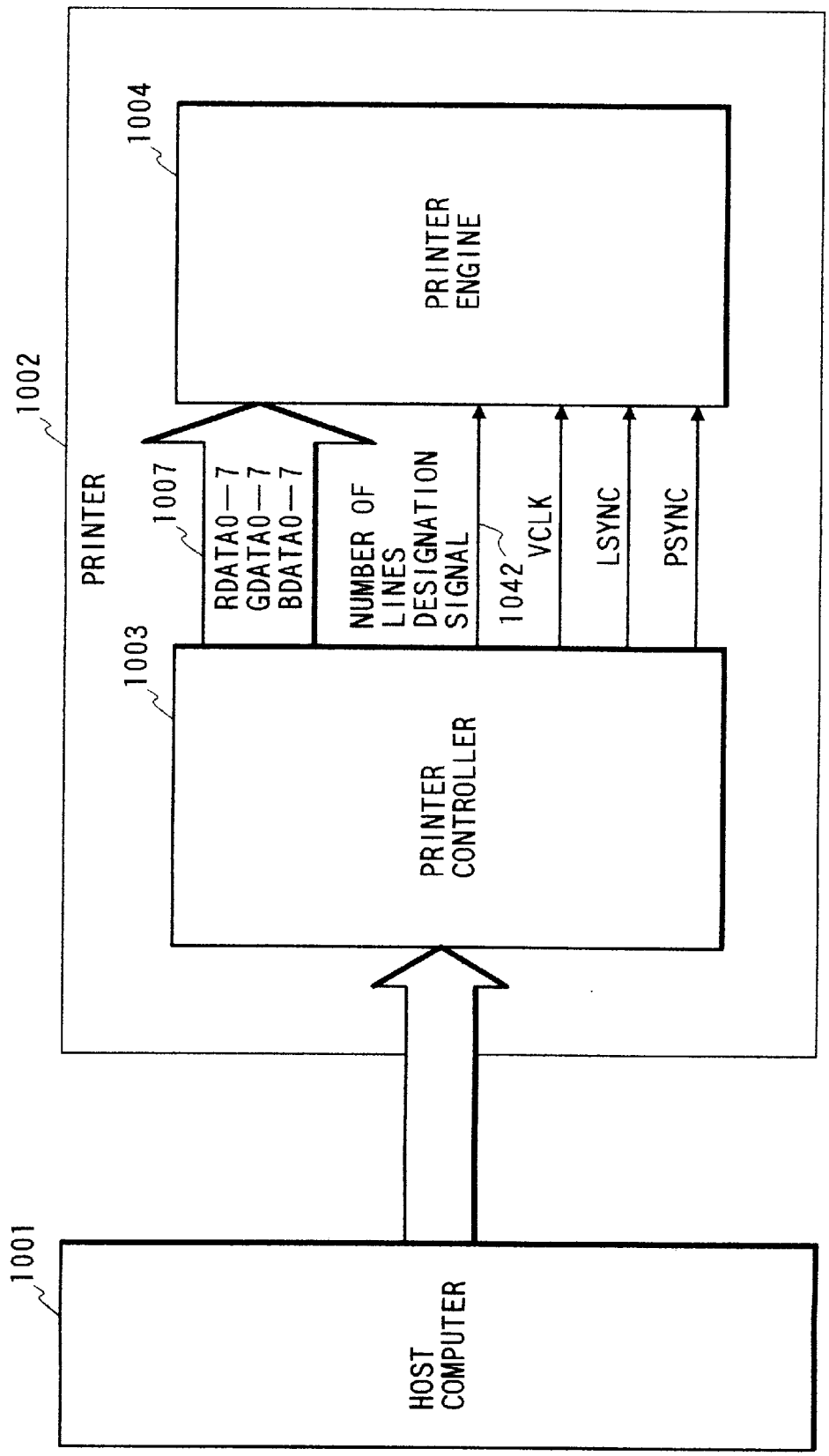
FIG. 18 shows a configuration of a system of the Embodiment 2.

FIG. 18 shows a block diagram of the Embodiment 2. A printer 1002 receives image information in a predetermined language from a host computer 1001 as an external unit and a printer controller 1003 develops the image and sends the image data 1007 to a printer engine 1004. The printer engine 1004 print the data in accordance with the image data 1007 to form a full color image. In the following description, it is assumed that the image data 1007 sends three-color data, red (R), green (G) and blue (B) and the printer engine 1004 prints the image at a resolution of 600 dpi (dots per inch).

In FIG. 18, major signals exchanged between the printer controller 1003 and the printer engine 1004 are color brilliance signals 7 (RDATA0 to RDATA7, GDATA0 to GDATA7 and BDATA0 to BDATA7), a number of lines designation signal 1042, an image transfer clock (VCLK) and a page sync signal (PSYNC).

Figure 19:
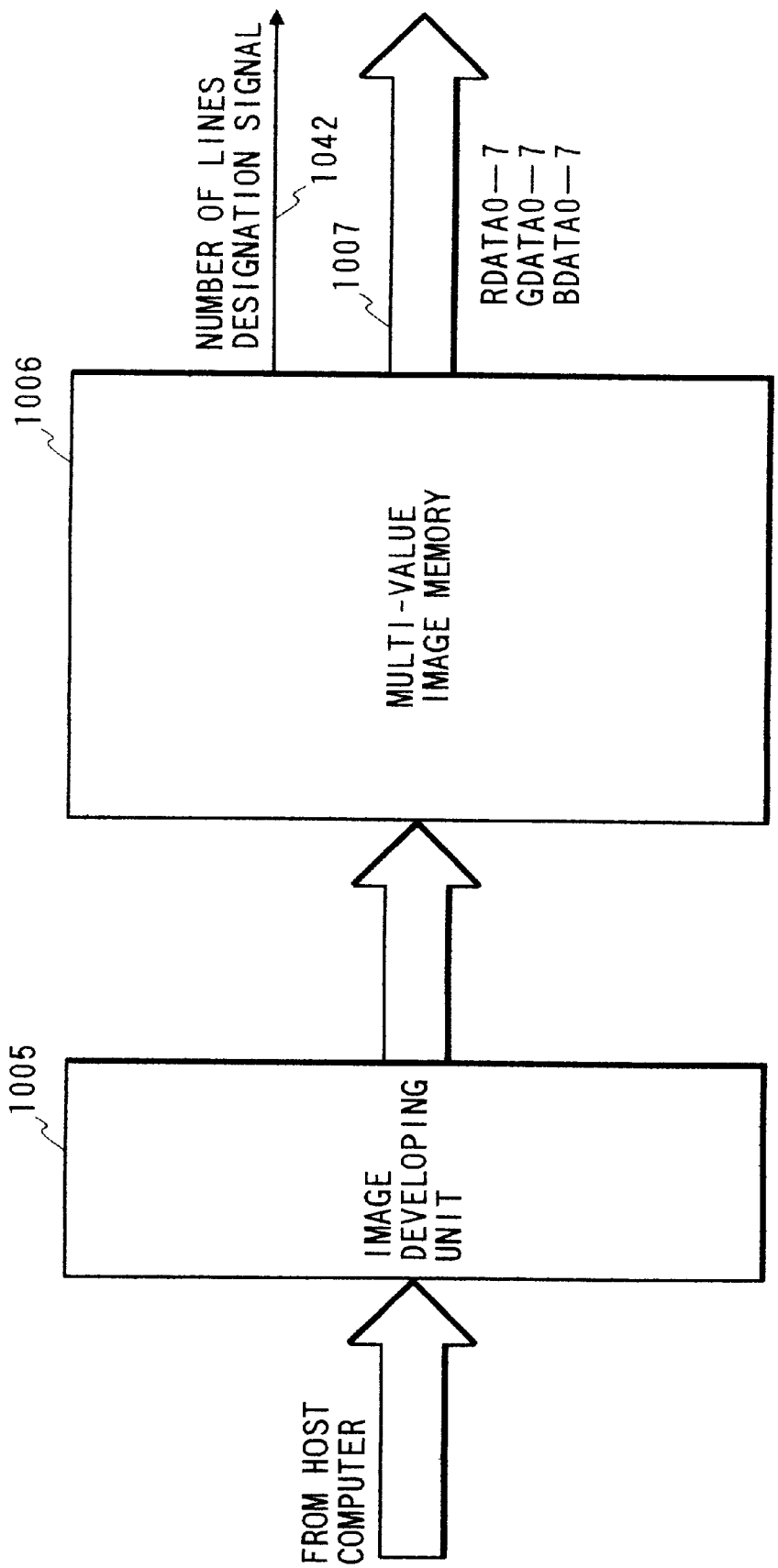
FIG. 19 shows a configuration of a controller.

FIG. 19 shows a block diagram of the printer controller 1003. The image developing unit 1005 develops the image data in the predetermined language sent from the host computer 1001 into R, G and B multi-value brilliance data and generates the number of lines designation signal for each pixel. One page of data is stored in a multi-value image memory 1006 and 24-bit brilliance data, 8 bits for each of R, G and B is sent to the printer engine 1004.

Figure 20:
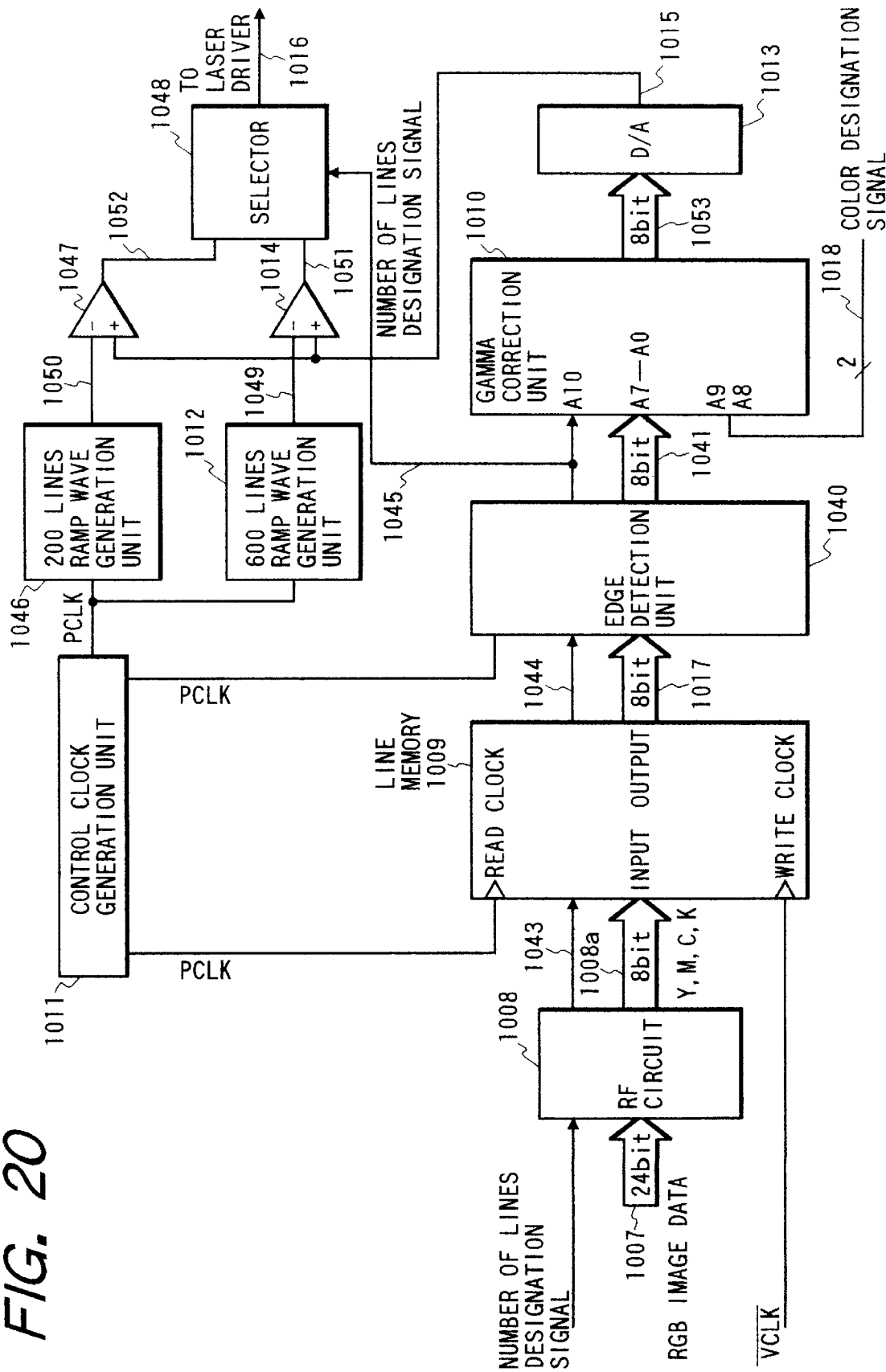
FIG. 20 shows a block diagram of signal processing of the printer engine.

FIG. 20 shows a block diagram of a signal processing unit of the printer engine 1004. The multi-value image data 1007 sent from the printer controller 1003 described above is color-converted by an RF (reproduction function) circuit 8 to magenta (M), cyan (C), yellow (Y) and black (K) image data and image data 1008 is outputted in the order of M, C, Y and K and is written into a line memory 1009 and read in synchronism with a rise of the image clock (PCLK) of the printer engine. The outputted multi-value image data 1017 is outputted to a gamma correction unit 1010 through an edge detection unit. The gamma detection unit 1010 comprises a look-up table (LUT) formed by a RAM or a ROM and the image data is inputted to addresses A0 to A7, the number of lines designation signal is inputted to A10 and the color designation signal is inputted to A8 and A9. An address map of the gamma correction table is shown in FIG. 22.

The gamma correction unit 1010 conducts the gamma correction in accordance with the color components of the 8-bit multi-value image signal 1041 designated by the color designation signal 1018 and the number of lines designated by the number of lines designation signal 1042. The 8-bit multi-value image signal 1053 from the gamma correction unit 1010 is converted to an analog voltage by a D/A conversion unit 1013 and is inputted to positive inputs of succeeding stage comparators 1014 and 1047. An output signal from a 600-line ramp signal generator 1012 is inputted to a negative input of the comparator 1014. The 600-line ramp signal generator 1012 converts the image clock PCLK to a ramp wave by an integration circuit. The comparator 1014 outputs a 600-line center growing PWM signal 1051 which is inputted to one terminal of a selector 1048.

On the other hand, an output from a 200-line ramp signal generator 1046 is inputted to a negative input of the comparator 1047. The 200-line ramp wave generator 1046 divides the image clock PCLK by three and converts it to a ramp signal by an integration circuit. The comparator 1047 outputs a 200-line center growing PWM signal 1052 which is inputted to the selector 1048. The selector 1048 selects one of the 200-line PWM signal and the 600-line PWM signal based on the number of lines designation signal 45.

A timing chart of the signals in the circuit diagram of FIG. 20 is shown in FIG. 21. As shown, which one of the 200-line PWM signal and the 600-line PWM signal is selected as the laser drive signal is determined by the number of lines designation signal 1045.

Figure 23:
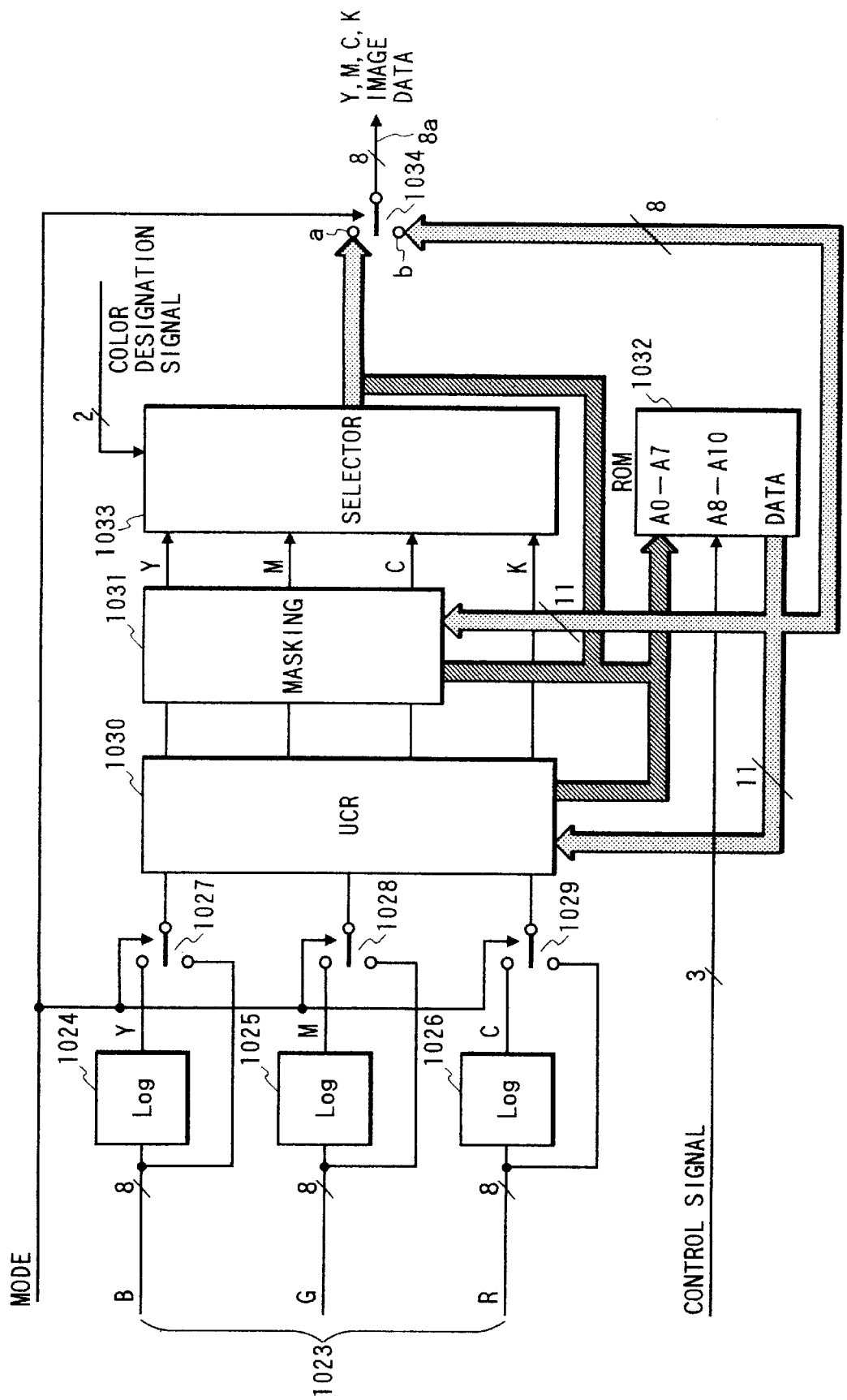
FIG. 23 shows a configuration of a RF circuit.

FIG. 23 shows a block diagram of the RF circuit 1008. Numerals 1024, 1025 and 1026 denote ROMs having logarithmic conversion LUTs, numerals 1027, 1028, 1029 and 1034 denote switches controlled by the mode selection signal (MODE), numeral 1030 denotes a UCR (under color removal) circuit, numeral 1031 denotes a masking circuit including a product-sum circuit, numeral 1032 denotes a ROM having a LUT for masking coefficient and UCR efficient (an address map thereof is shown in FIG. 24) and numeral 1033 denotes a selector.

Detail of the operation of the RF circuit is now explained. The R, G, B 8-bit multi-value brilliance data 1007 outputted from the printer controller are logarithmically converted by the LUTs stored in the ROMs 1024, 1025 and 1026 such that blue (B) is density-converted to yellow (Y), green (G) to magenta (M) and red (R) to cyan (C), and are inputted to the UCR circuit 1030.

The table of the UCR circuit 1030 and the masking coefficients of the masking circuit 1031 are set appropriately from the tables and masking coefficients stored in the ROM 1032 based on the control signal.

Address data is sent to A0 to A7 and the cyan (C) UCR data corresponding to the input data is outputted from DATA. Then, the control signal is sent to A8 to A10 of the ROM 1032 to set the bank, the address data is sent from the register of the masking circuit 1031 to A0 to A7 of the ROM 1032 and the ROM 1032 sets the masking coefficient of the addressed cyan (C) to the masking circuit 1031. The cyan (C) image data outputted from the UCR circuit 1030 is multiplied and summed with the masking coefficient set by the masking circuit 1031 and the result is outputted to the selector 1033. The selector is then switched by the color designation signal and the cyan (C) image data is outputted to the succeeding stage. This operation is conducted for one field of data. Then, the control signal is sent to A8 to A10 of the ROM 1032 to select the yellow (Y) UCR table, the UCR circuit 1030 detects a minimum value of Y, M and C and sends the minimum value to A0 to A7 of the ROM 1032 to address it and the yellow (Y) UCR data corresponding to the input data is outputted from DATA. Then, the control signal is sent to A1 to A10 of the ROM 1032 to set the bank, the address data is sent from the register of the masking circuit 1031 to A0 to A7 of the ROM 32 and the ROM 32 sets the addressed yellow (Y) masking coefficient data to the masking circuit 1031. The yellow (Y) image data outputted from the UCR circuit 1030 is multiplied and summed with the masking coefficient set by the masking circuit 1031 and the result is outputted to the selector 1033. The selector is switched by the color designation circuit and the yellow (Y) image data is outputted to the succeeding stage. This operation is conducted for one field of data. Then, the control signal is sent to A8 to A10 of the ROM 1032 to select the black (K) UCR table, the UCR circuit 1030 detects a minimum value of Y, M and C and sends the minimum value to A0 to A7 of the ROM 1032 to address it and the black (K) UCR data corresponding to the input data is outputted from DATA. Then, the black (K) image data outputted from the UCR circuit 1030 is outputted to the selector 1033. Then, the selector 1033 is switched by the color designation signal and the black (K) image data is outputted to the succeeding stage. This operation is conducted for one field of data. By the four-step operation described above, one field of color conversion process is completed.

Specifically, the control signal is sent to A8 to A10 of the ROM 1032 to select the magenta (M) UCR table and the UCR circuit 1030 detects a minimum value of the input Y, M and C 8-bit data. The detected minimum value is sent to A0 to A7 of the ROM 1032 and the magenta (M) UCR data corresponding to the input data is outputted from DATA. Then, the control signal is sent to A8 to A10 of the ROM 32 to set the bank, the address data is sent from the register of the masking circuit 1031 to A0 to A7 of the ROM 1032 and the ROM 1032 sets the addressed magenta (M) masking coefficient data to the masking circuit 1031. Then, the magenta (M) image data outputted from the UCR circuit 1030 is multiplied and summed with the masking coefficient set by the masking circuit 1031 and the result is outputted to the selector 1033. Then, the selector is switched by the color designation signal and the magenta (M) image data is outputted to the succeeding stage. This operation is conducted for one field of data and then the control signal is sent to A8 to A10 of the ROM 1032 to select the cyan (C) UCR table, the UCR circuit 1030 detects a minimum value of Y, M and C and sends the minimum value to A0 to A7 of the ROM 1032 to address it. When the image data is monochromatic, the switches 1027, 1028, 1029 and 1034 are connected to the position B by the MODE signal so that the R, G and B multi-value image data is inputted to the UCR circuit 1030 and directly inputted to the masking circuit 1031. Then, the control signal is sent to A8 to A10 of the ROM 1032 to set the bank, the address data is sent from the register of the masking circuit 1031 to A0 to A7 of the ROM 1032 and the ROM 1032 sets the addressed brilliance converted coefficient data to the masking circuit 1031. The image data is brilliance-converted in the same manner as that for the color image and outputted from the selector 1033. Then, the control signal is sent to A8 to A10 of the ROM 1032 to set the black and white mode, the data outputted from the selector 1033 is sent to A0 to A7 of the ROM 1032 to address it and the logarithmically converted data corresponding to the input data is outputted from DATA. By this operation, the black and white mode image is outputted.

Figure 25:
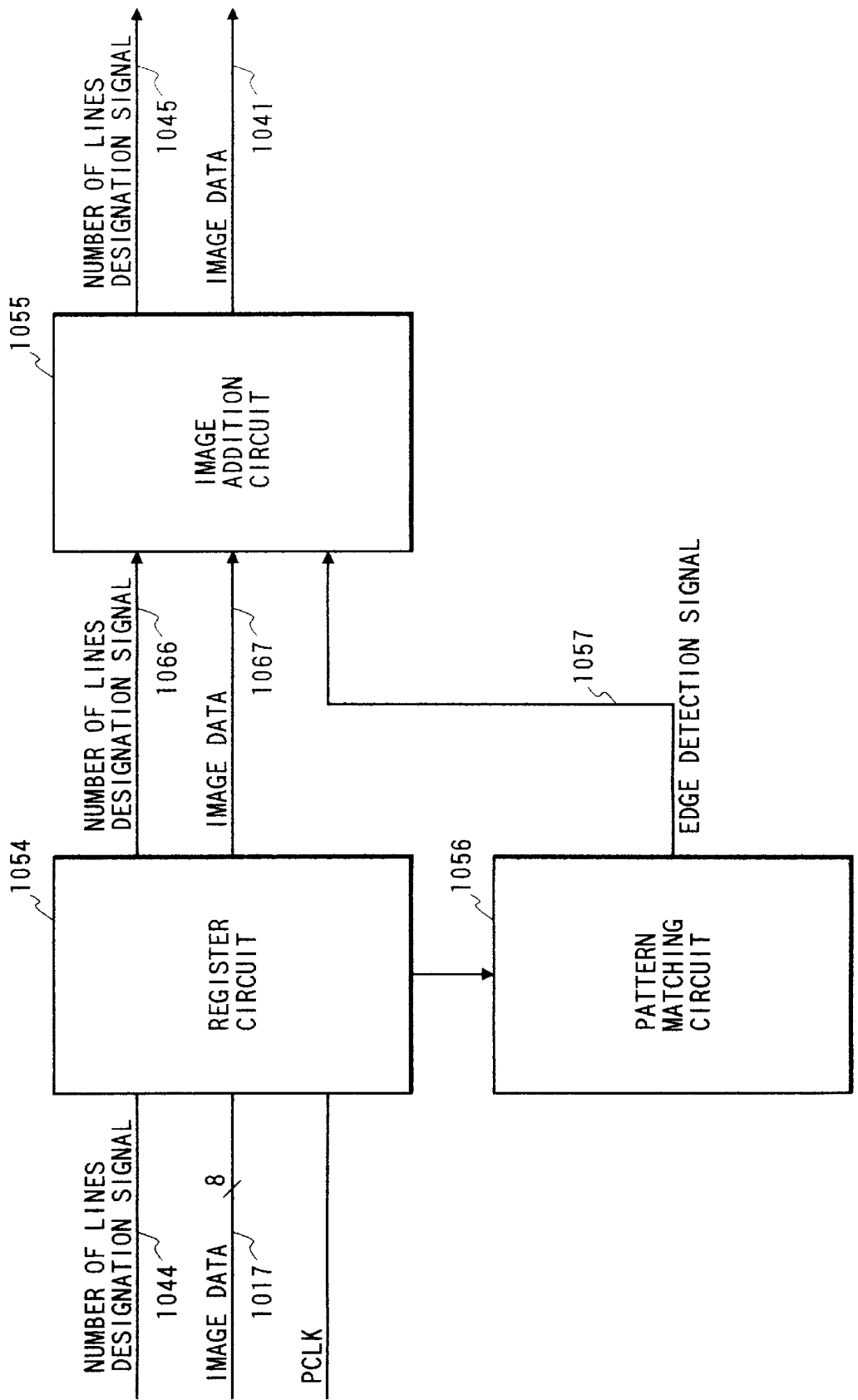
FIG. 25 shows a configuration of an edge detection unit.
Figure 26:
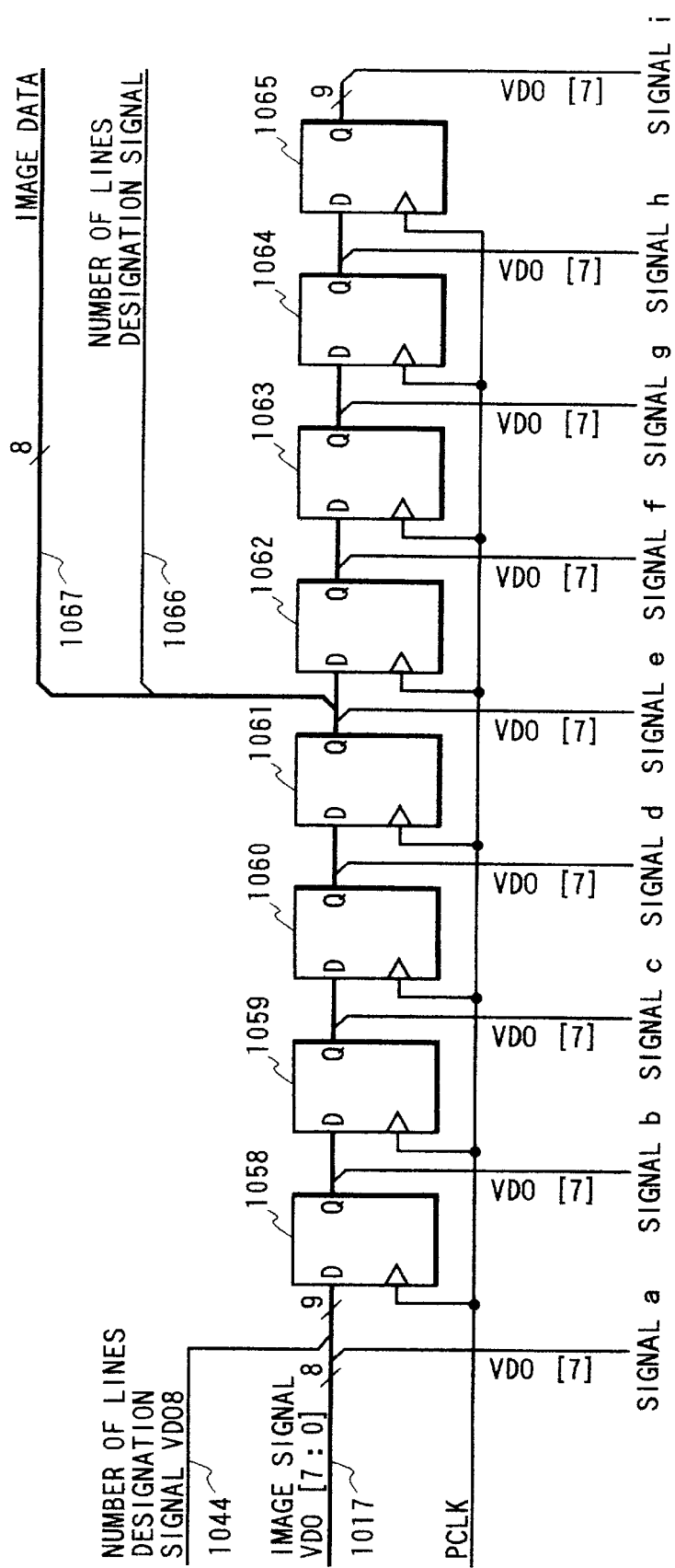
FIG. 26 shows a circuit diagram of a register circuit.

FIG. 25 shows a block diagram of the edge detection unit 1040. The edge detection unit comprises three units, a register circuit 1054, an image adding circuit 1055 and a pattern matching circuit 1056. FIG. 26 shows a circuit diagram of the register circuit 1054. It has a function to hold 8 bits, in a main scan direction, of sequentially sent 8-bit image signal 1017 and a number of lines designation signal 44. In this circuit, the image signal is delayed by four dots and sent to the succeeding stage image adding circuit 1055. Of the image signal outputted from 9-bit flip-flops 58 to 65, the most significant bit (VDO (7)) is sent to the pattern matching circuit 1056.

Figure 27:
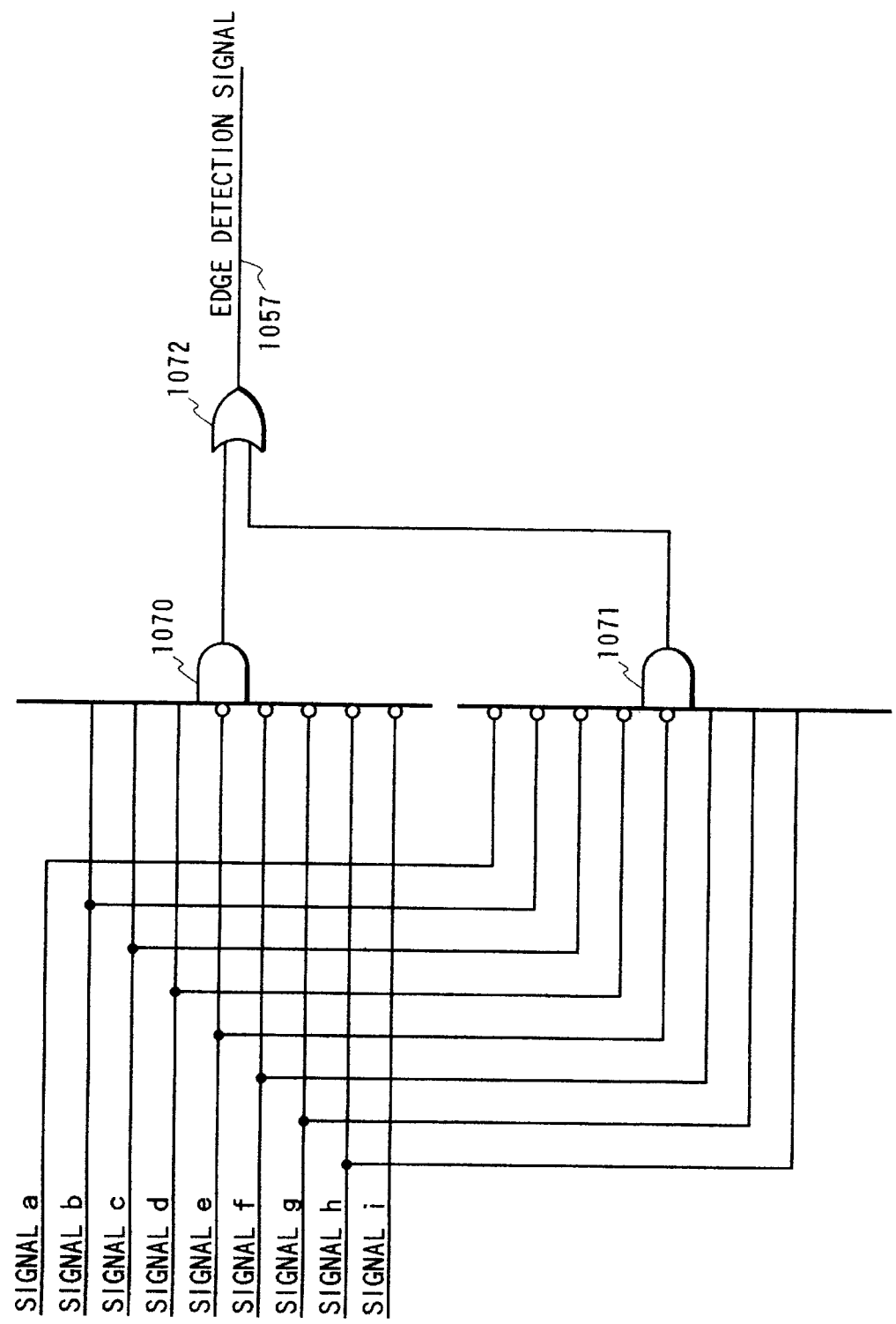
FIG. 27 shows a circuit diagram of a pattern matching circuit.
Figure 29:
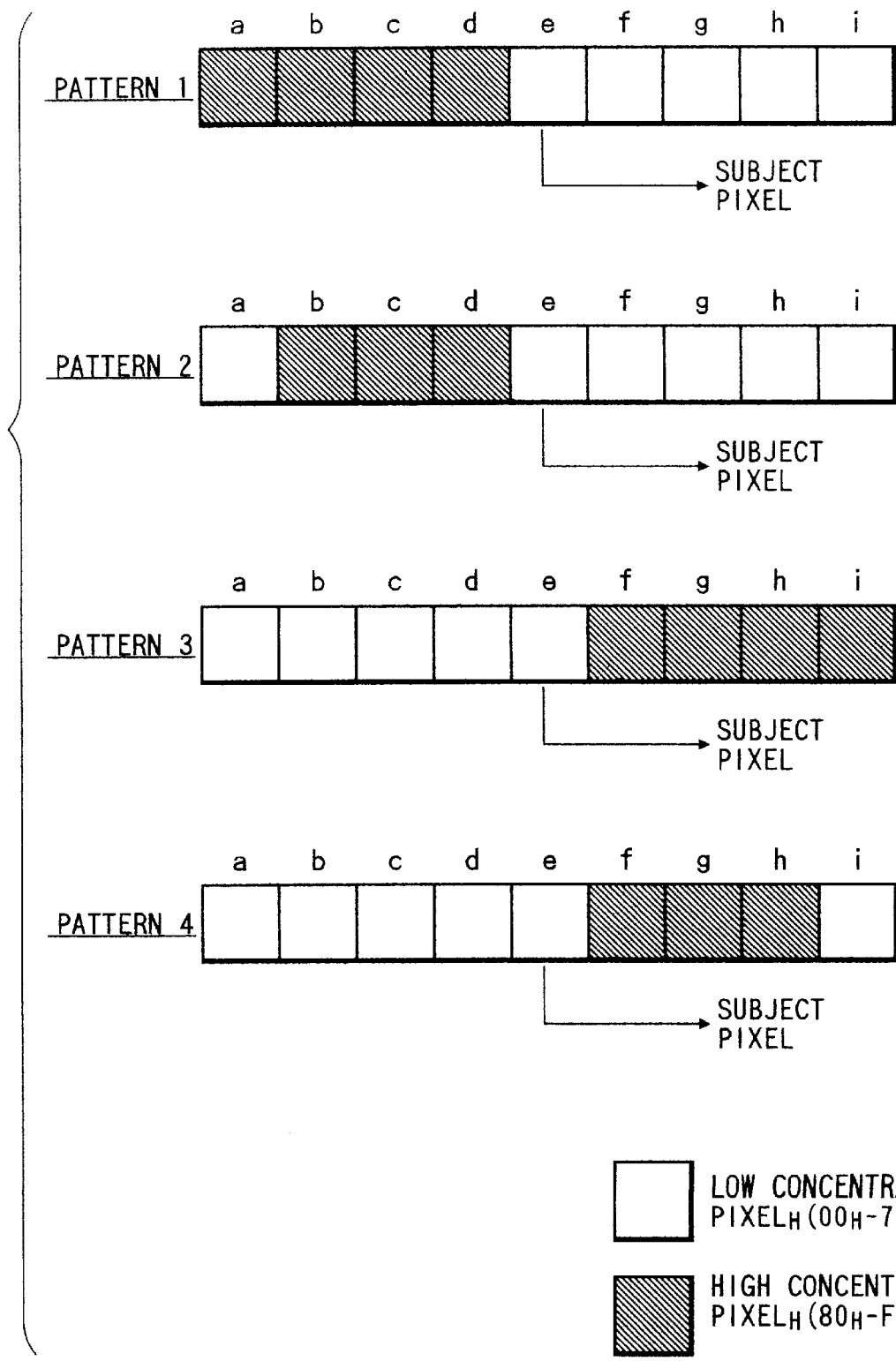
FIG. 29 illustrates a pattern matching process.

FIG. 27 shows a circuit diagram of the pattern matching circuit. When an image condition shown in FIG. 29 is met, an edge detection signal outputted from an OR circuit 1072 is High. Signals a to i are Low when the multi-value image signal is 00(H) to 7F(H) and High when the multi-value image signal is 80(H) to FF(H).

Figure 28:
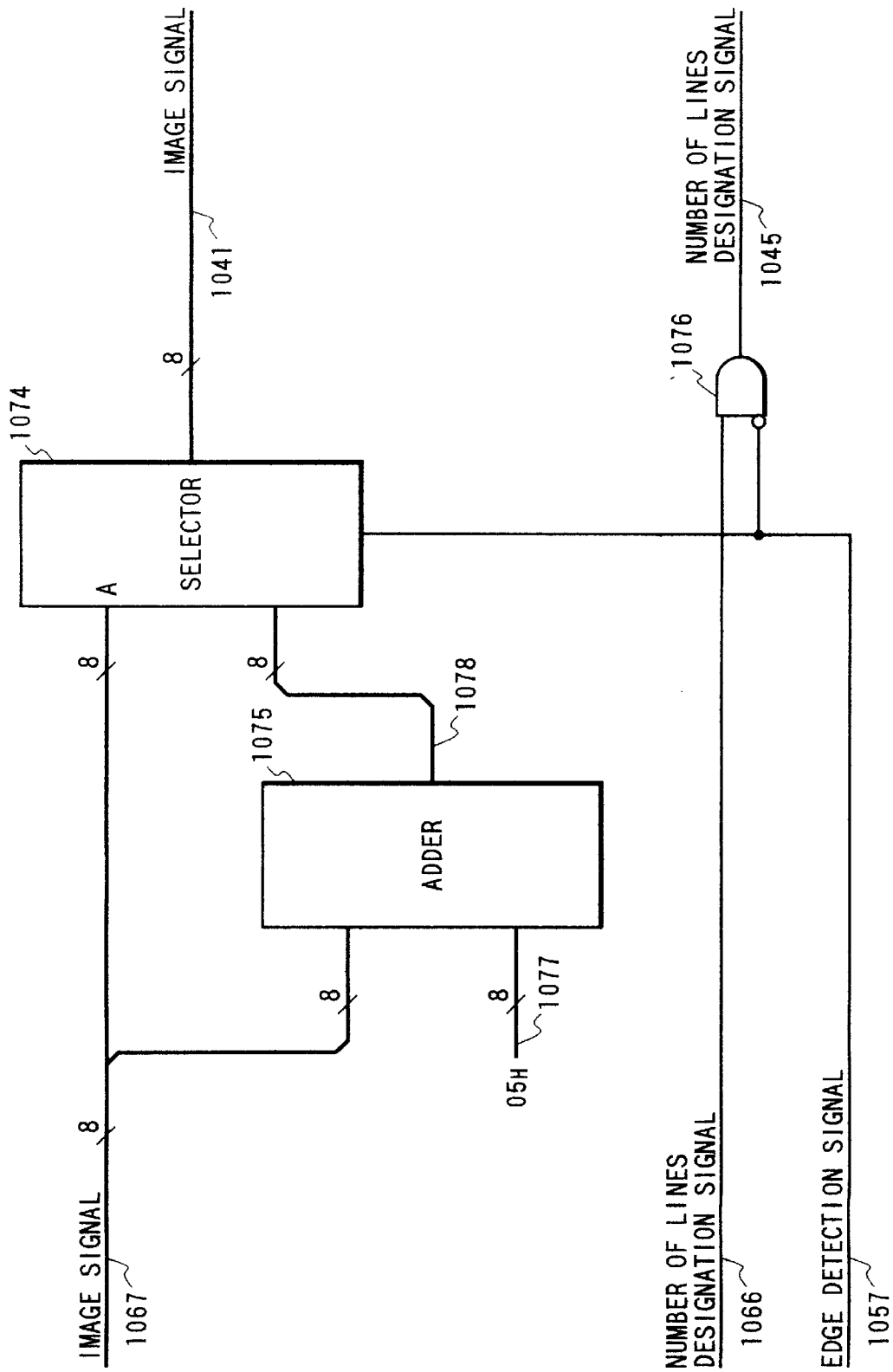
FIG. 28 shows a circuit diagram of an image adding circuit.

FIG. 28 shows the image adding circuit. In FIG. 28, numeral 1075 denotes an adder for adding 8-bit data and 8-bit data (which is fixed to 05(H) in the present circuit). When a sum exceeds FF(H), it is rendered to FF(H).

In this circuit, when the edge detection signal 57 is Low, the image signals VDO(7)-VDO(0) outputted from the register circuit 1054 and the number of line designation signal 1066 are outputted as is. When the edge detection signal 67 is High, 05(H) is added to the image signals VDO(7)-VDO(0) sent from the register circuit 1054 and a sum image signal 1041 and the Low number of lines designation signal 1045 (designating the 600-line PWM) are outputted. The image signal 1041 and the number of lines designation signal 1045 are inputted to the gamma correction unit 1010. In the present circuit, the add value is set to 05(H) although this value may be determined based on the gamma characteristic of the printer.

FIG. 29 represents a matching condition of the pattern matching circuit. For a pixel e under consideration, the surrounding pixels along the main scan direction are referred to determine the matching. Taking a pattern 1 as an example, when the pixel e under consideration is a low density pixel, pixels f to i are low density pixels and pixels a to d are high density pixels, the pixel e under consideration is determined as the matching pixel and a predetermined value (05(H) in the present example) is added to the original image data.

Figure 30:
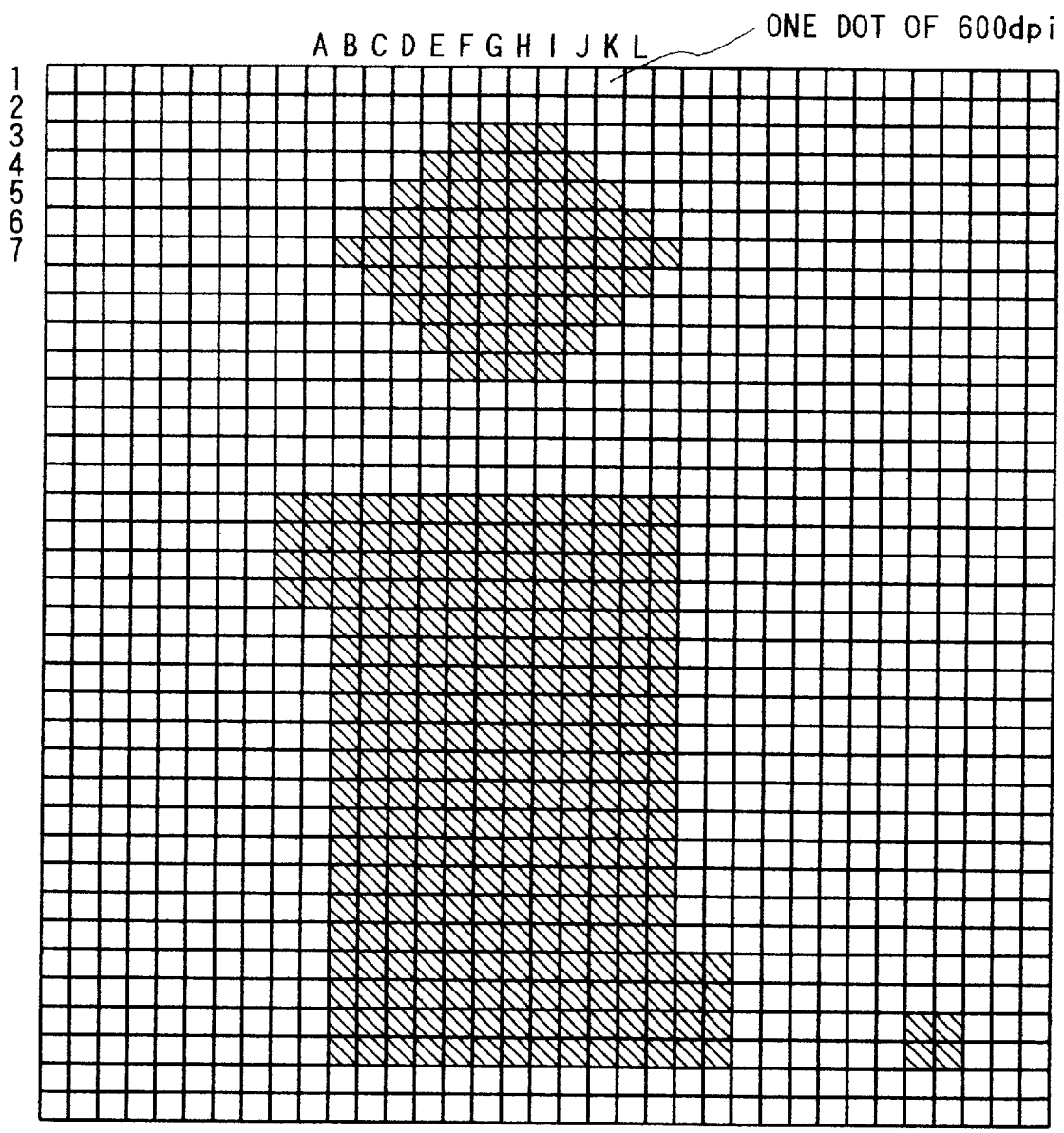
FIG. 30 shows image data before conversion.
Figure 31:
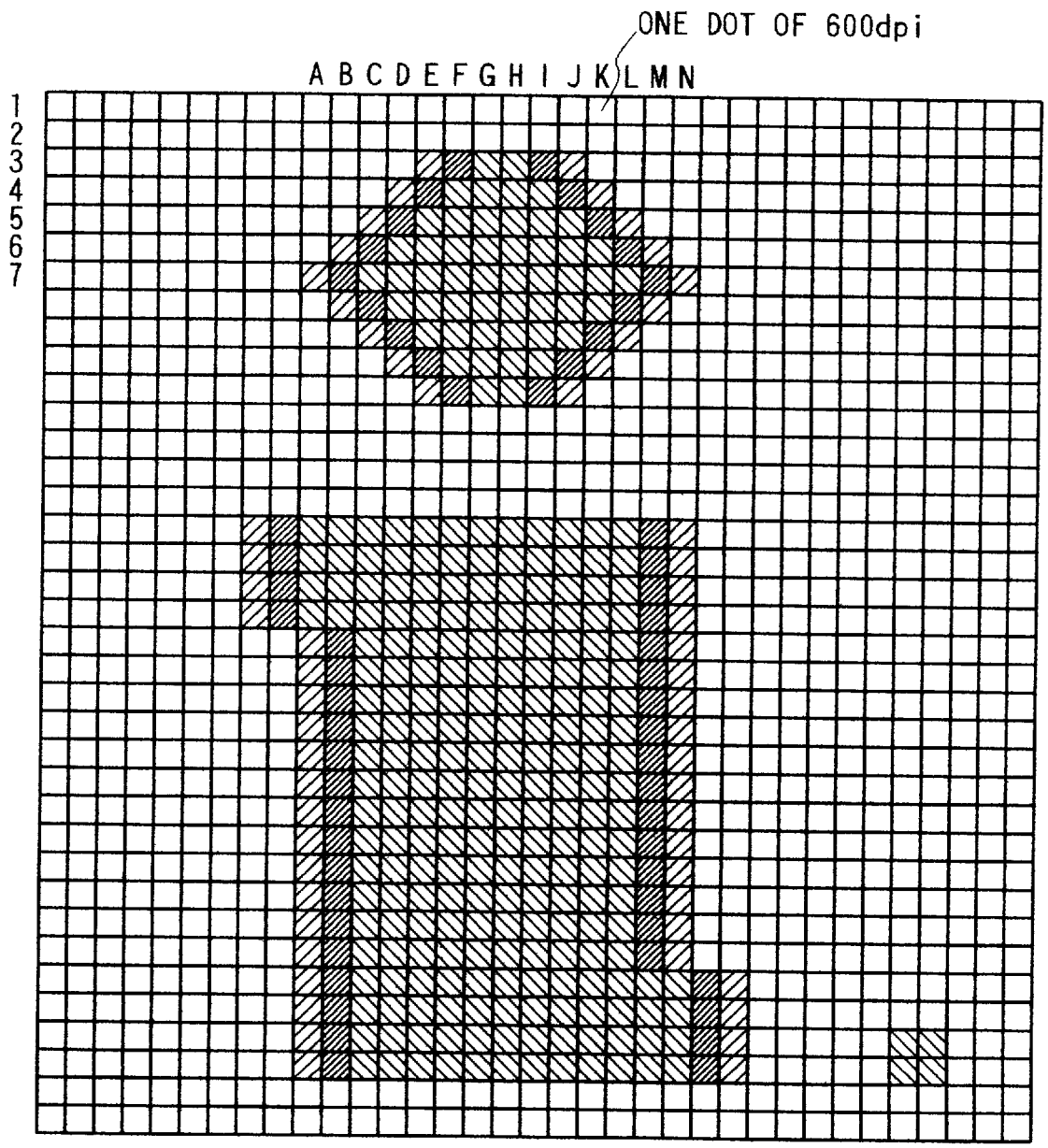
FIG. 31 shows image data after conversion.

FIGS. 30 and 31 show manners of image data conversion in the present embodiment. In FIG. 30, the signals (image data 1017 and number of lines designation signal 1044) are color-converted by the RF circuit 1008 and buffered in the line memory 1009. M represents a magenta data value, C represents a cyan data value, Y represents a yellow data value, K represents a black data value and IMCHR represents a number of lines designation signal (which designates the 600-line by Low and the 200-line by High). FIG. 31 shows the converted signals (image data 1041 and the number of lines designation signal 1045) in the present embodiment.

The process of conversion is now explained taking the third line of FIG. 31 as an example. In printing the magenta color image data, the F dot third line pixel (hereinafter referred to as F3) and the pixel I3 are converted to 00(H) and 05(H). The pixel F3 matches to the pattern of FIG. 12 and the pixel I3 matches to the pattern 3. The printing of the yellow color image data is conducted in the same manner as that for the magenta data. In the printing of the black color data, the pixels E3 and J3 are converted from 00(H) to 05(H). The pixel E3 matches to the pattern 3 and the pixel J3 matches to the pattern 1. In any case, for the pixel converted while the image data matches to the pattern 1 to 4, the number of lines designation signal is converted from High to Low.

A fine image less than 2 dots is not converted.

Figure 32A:
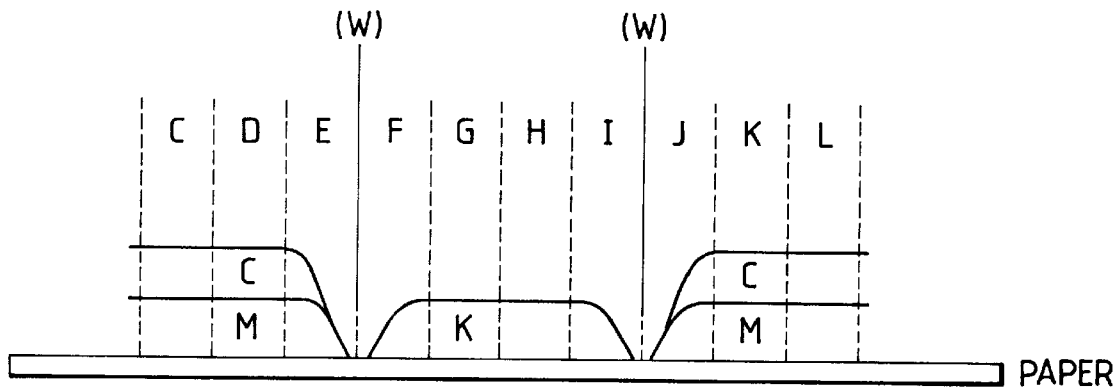
FIGS. 32A and 32B illustrate an effect of the Embodiment 2.
Figure 32B:
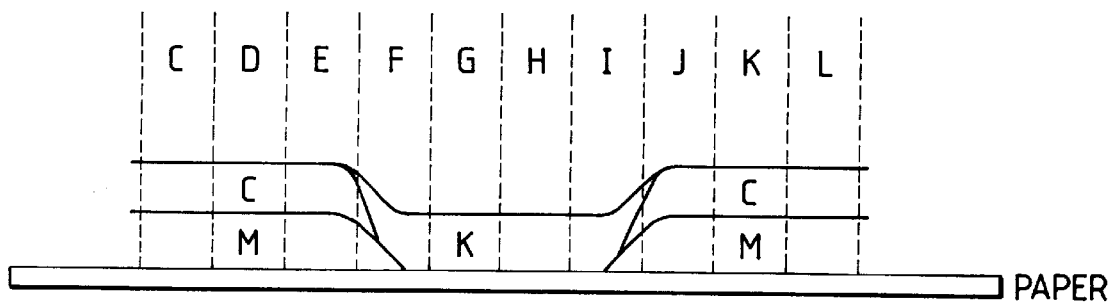

FIG. 32A shows a manner of depositing the toner on the sheet in the prior art. FIG. 32B shows a manner of depositing the toner on the sheet in the present embodiment. In both cases, the dots A to J of the third line are considered. As shown, in FIG. 32A, an area in which the toner is not deposited is present in the boundary of the image (point w) and a white stripe appears but in FIG. 32B, the white stripe disappears and a high grade image is attained.

Namely, in accordance with the present embodiment, the pattern matching along the main scan direction is used for each color to detect the edge for each color and the image level is raised to apply weak laser emission to the pixels near the edge to suppress the narrowing of the image along the main scan direction due to the electric field wrapping which is the cause of the white stripe.

Further, since the edge detection is conducted based on the Y, M, C and K image data corresponding to the recording agents used in the printer, the edge at which the white stripe appears can be precisely detected.

Further, since the recording is made at a high resolution for the edge detected by the edge detection unit 1040 without regard to the number of lines designation signal, the edge area is reserved and the high grade image is attained.

[Modification 1]

Figure 33:
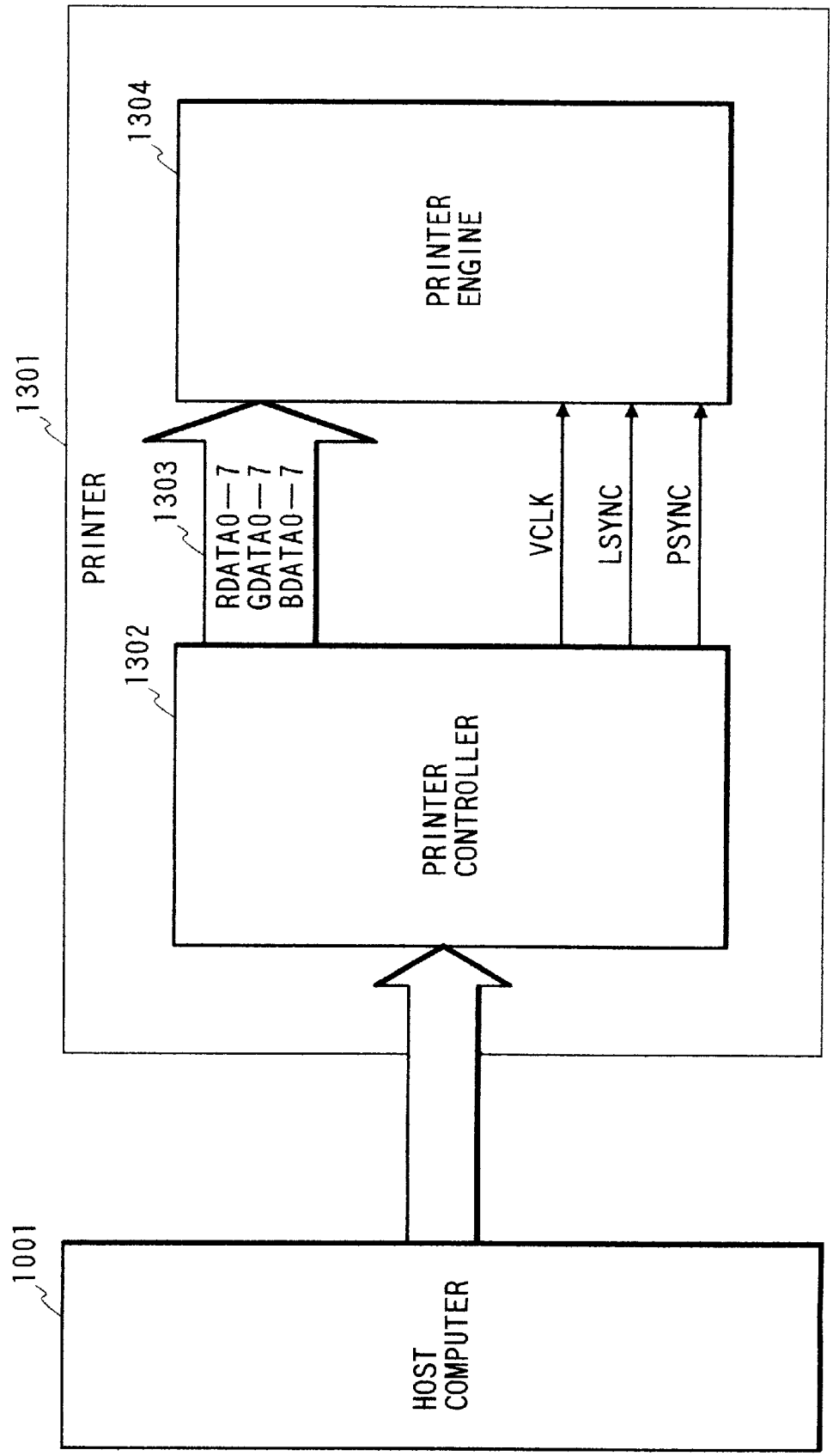
FIG. 33 shows a configuration of a system of the Embodiment 2.

FIG. 33 shows a block diagram of a Modification 1 of the Embodiment 2. In the Modification the number of lines of the PWM in the Embodiment 2 is only set to 200 lines. Accordingly, the number of lines designation signal between the printer controller 1302 and the printer engine 1304 in FIG. 33 is omitted.

Figure 34:
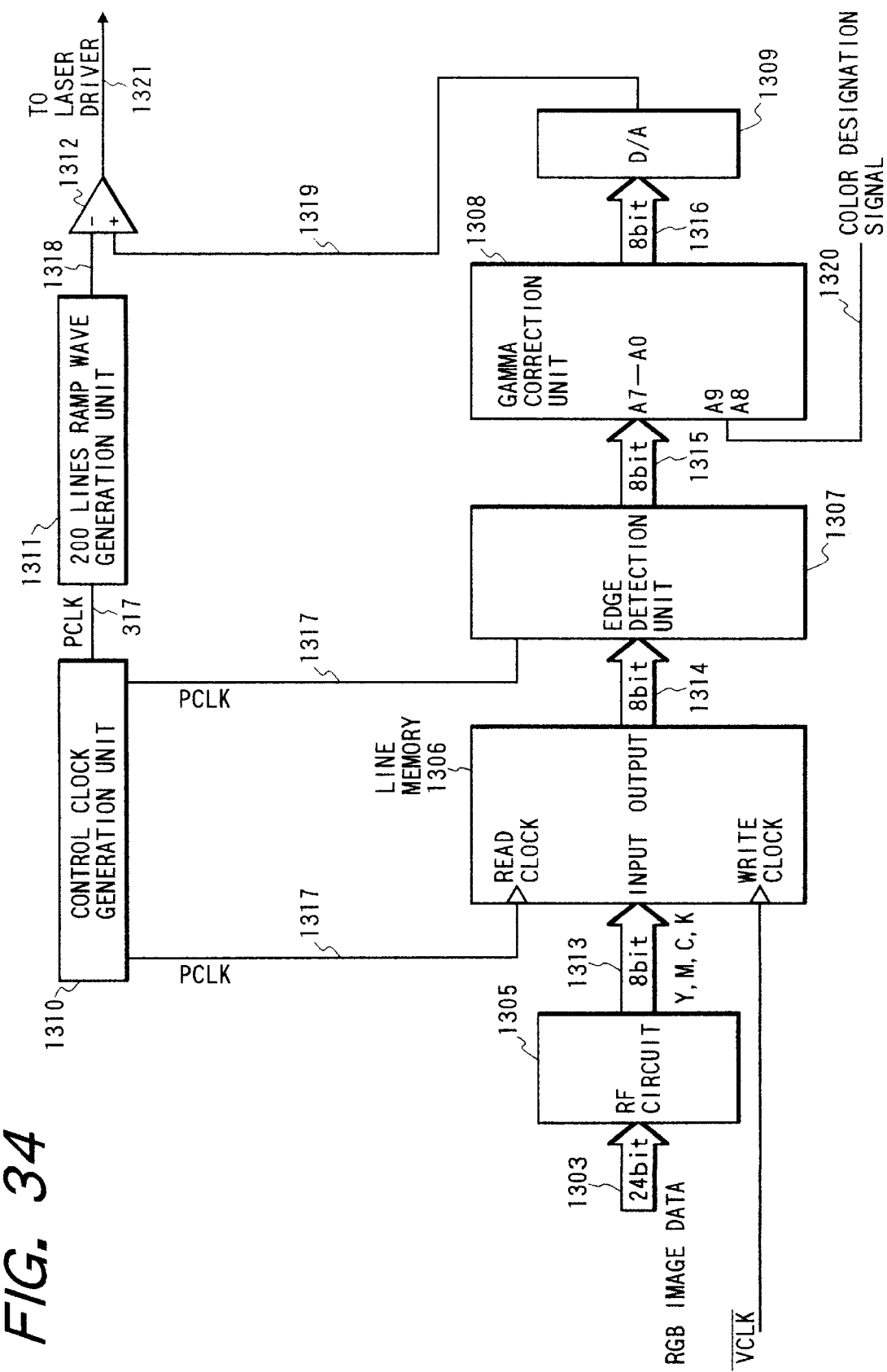
FIG. 34 shows a block diagram of signal processing of a printer engine of a Modification 1.

FIG. 34 shows a block diagram of the printer engine 1304. As shown, only one circuit for conducting the PWM (the D/A converter 1309, the comparator 1312 and the ramp wave generator 1311) for the 200 lines is provided.

In this circuit configuration, the value to be added to the pixel determined as the edge of the image by the edge detection unit is rendered small so that the white stripe at the boundary of the color images is eliminated and the high grade image is attained.

Figure 35:
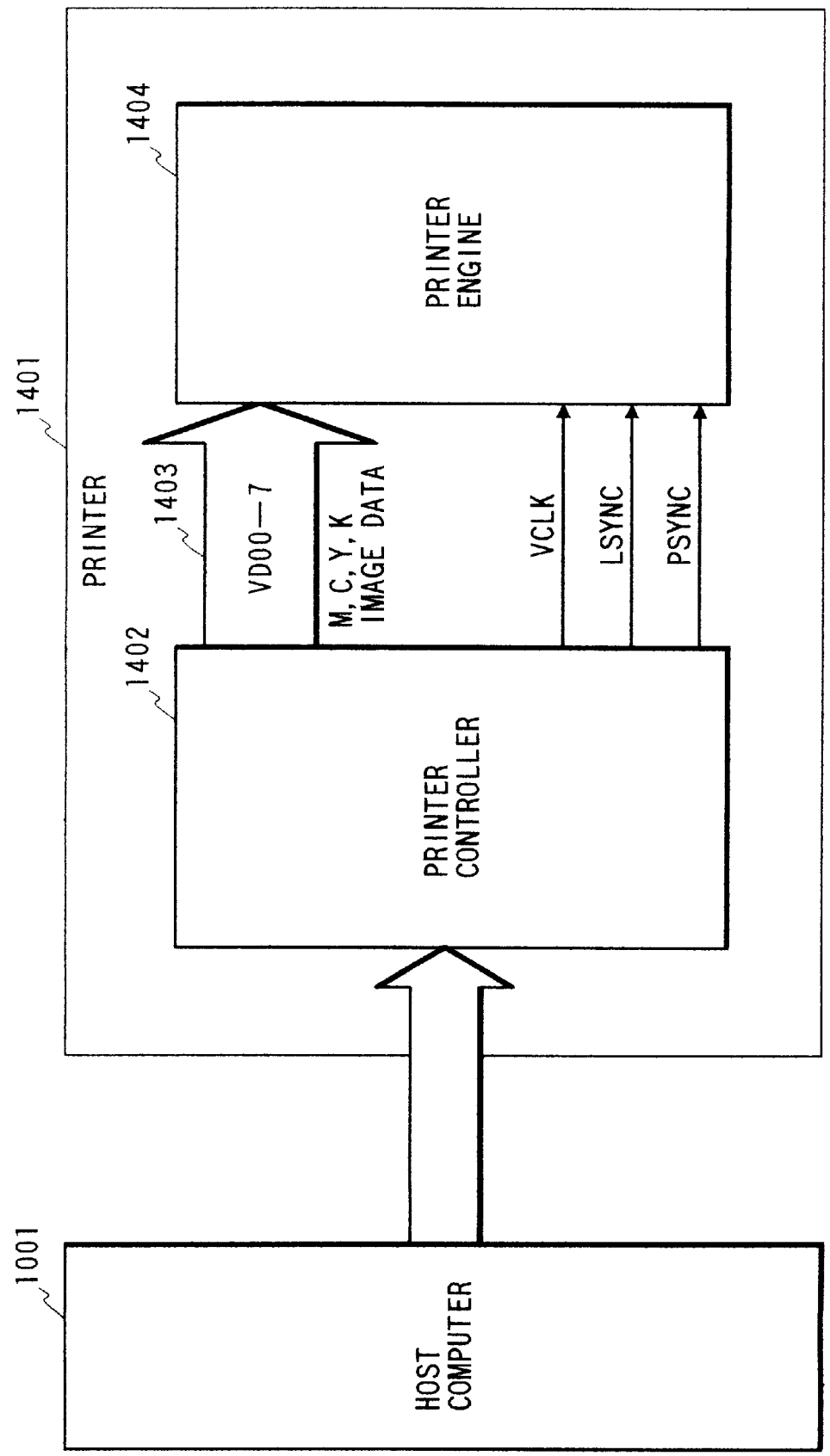
FIG. 35 shows a configuration of a system of the Modification 1.
Figure 36:
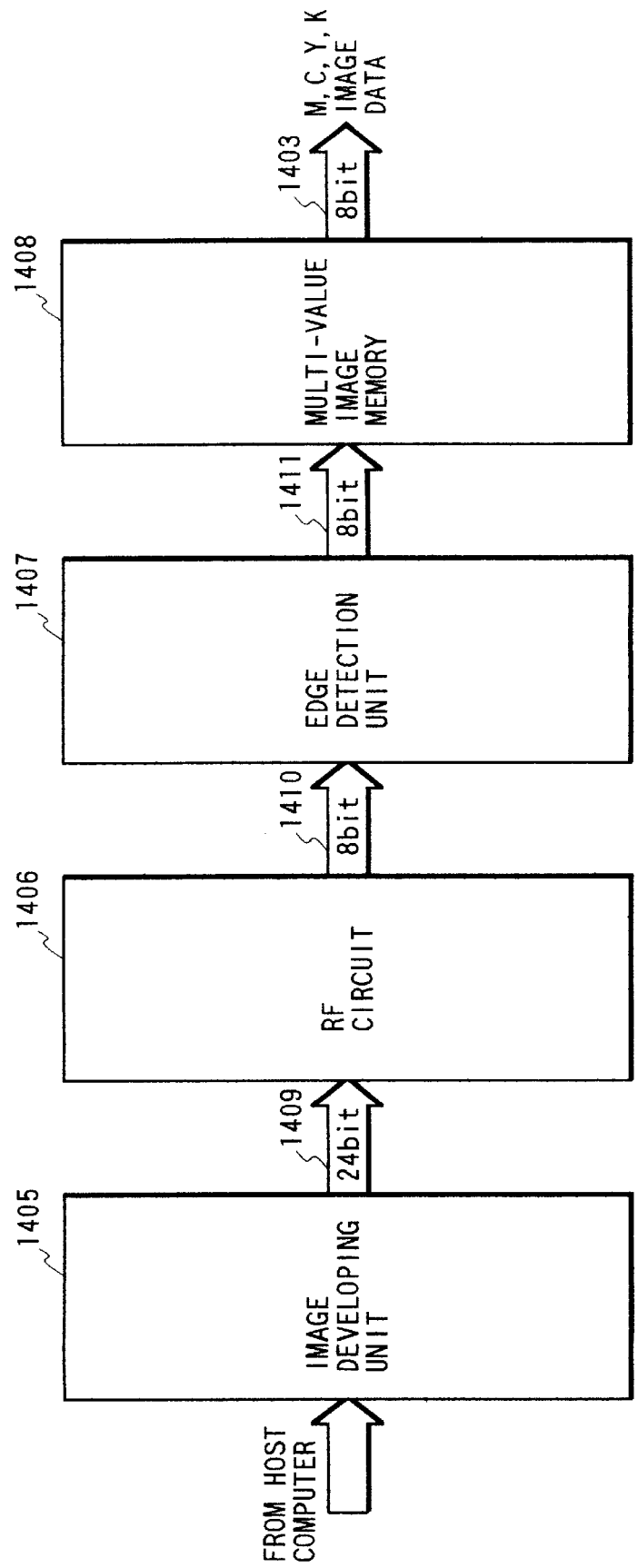
FIG. 36 shows a configuration of a controller of the Modification 1.
Figure 37:
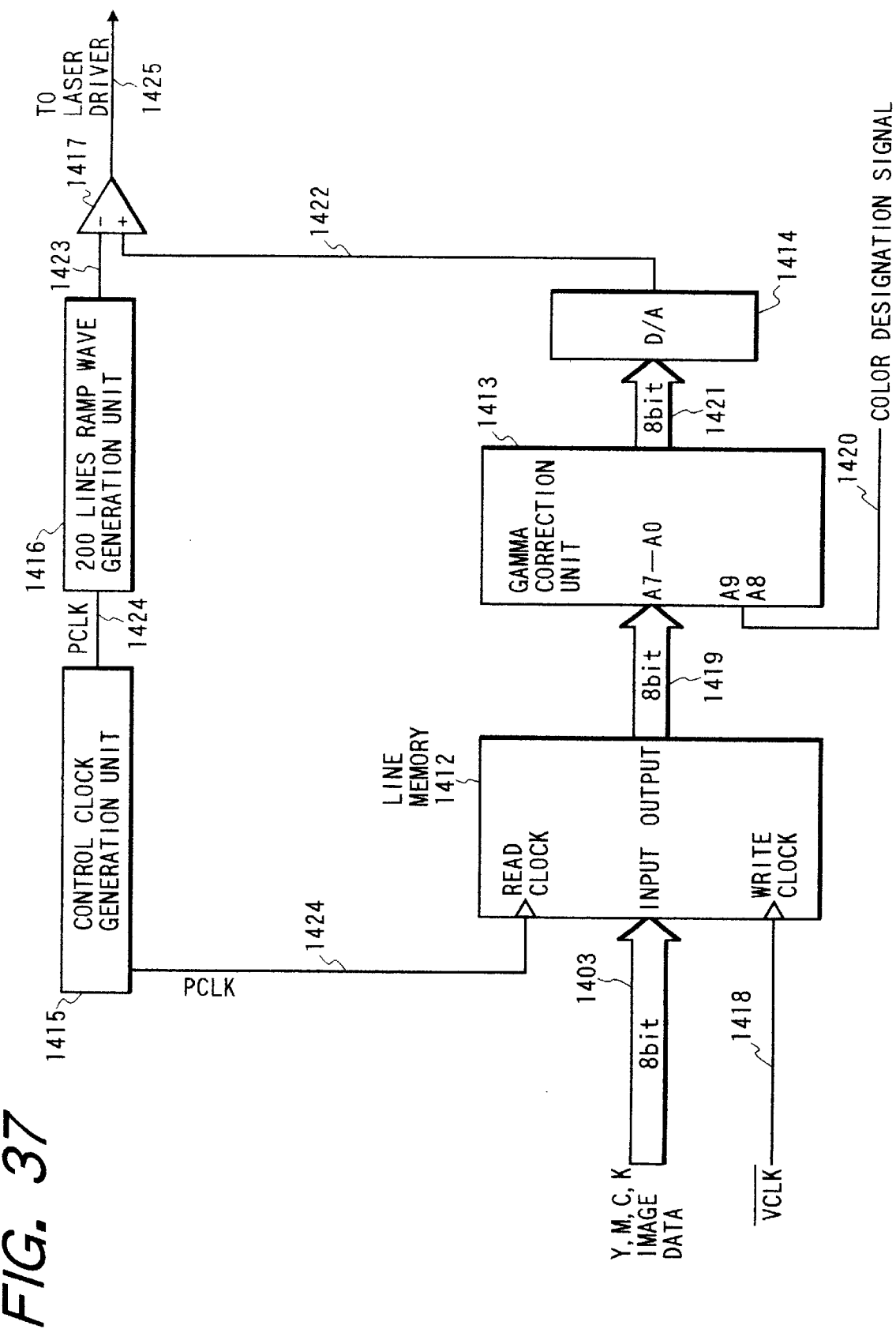
FIG. 37 shows a block diagram of signal processing of a printer engine of a modification of the Embodiment 2.
Figure 38:
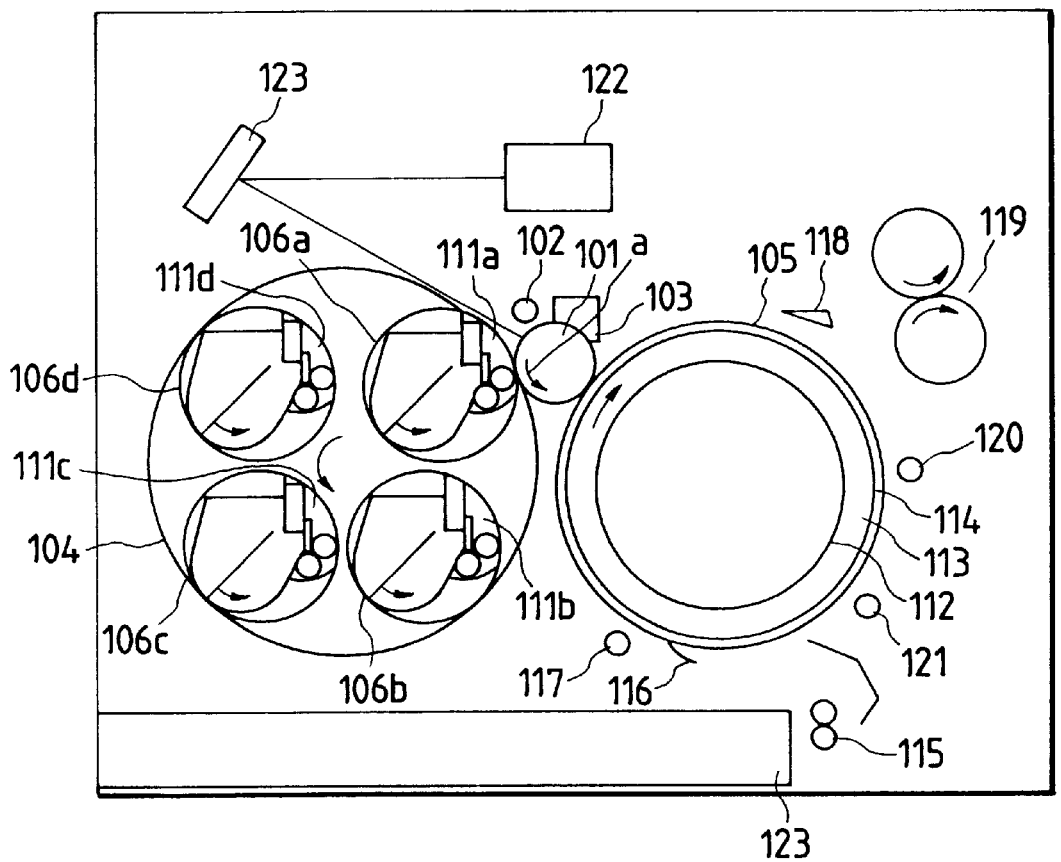
FIG. 38 shows a configuration of a color image forming apparatus by a prior art contact developing system.

As shown in FIGS. 35, 34 and 37, the printer controller 1402 may convert to the YMCK image and detect the edge and the color correction may be made such that the laser emission is rendered small at the edge.

[Modification 2]

In the printer controller 3 of the Embodiment 2, the image signal in the predetermined language from the host computer is developed in the multi-value image memory into the R, G and B brilliance image data and an outline is detected based on the R, G and B brilliance image data to generate the number of lines designation signal to designate the 200-line or the 600-line.

In accordance with the Modification 2, since the detection is made based on the R, G and B brilliance image data which represents the original image with high fidelity, the high precision detection is attained.

On the other hand, since the edge detection to detect the edge at which the laser emission is rendered small is conducted based on the Y, M, C and K image data, the area at which the white stripe appears can be precisely detected.

Figure 39:
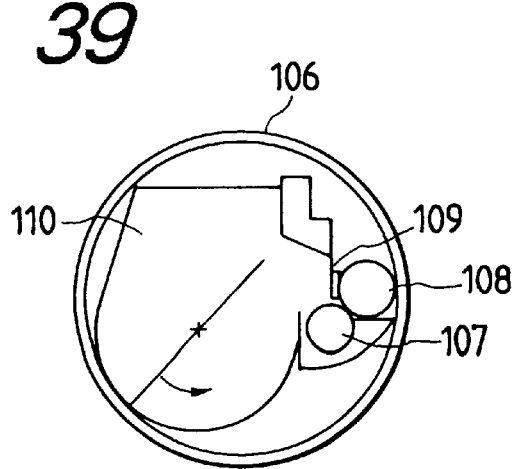
FIG. 39 shows a configuration of a developing device of FIG. 38.
Figure 40:
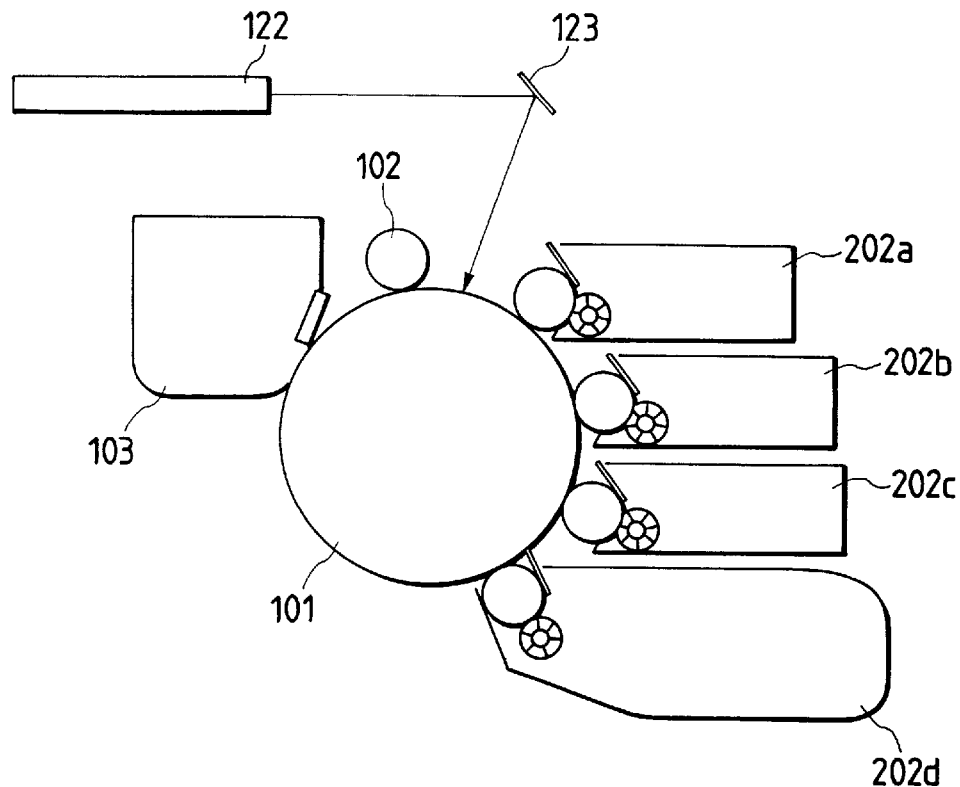
FIG. 40 shows a configuration of a color image forming apparatus by a prior art non-contact developing system.
Figure 41:
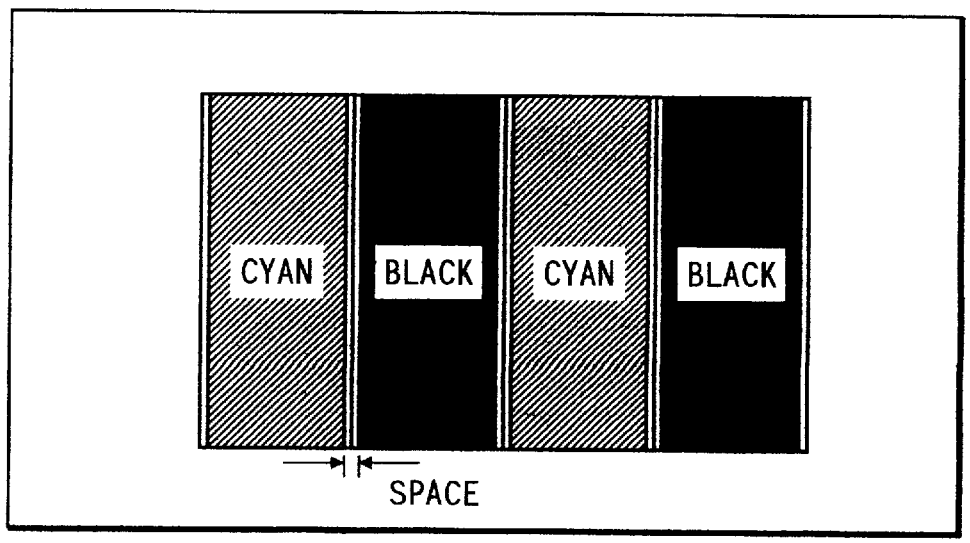
FIG. 41 shows a color image formed by the color image forming apparatus by the prior art non-contact developing system.
Figure 42:
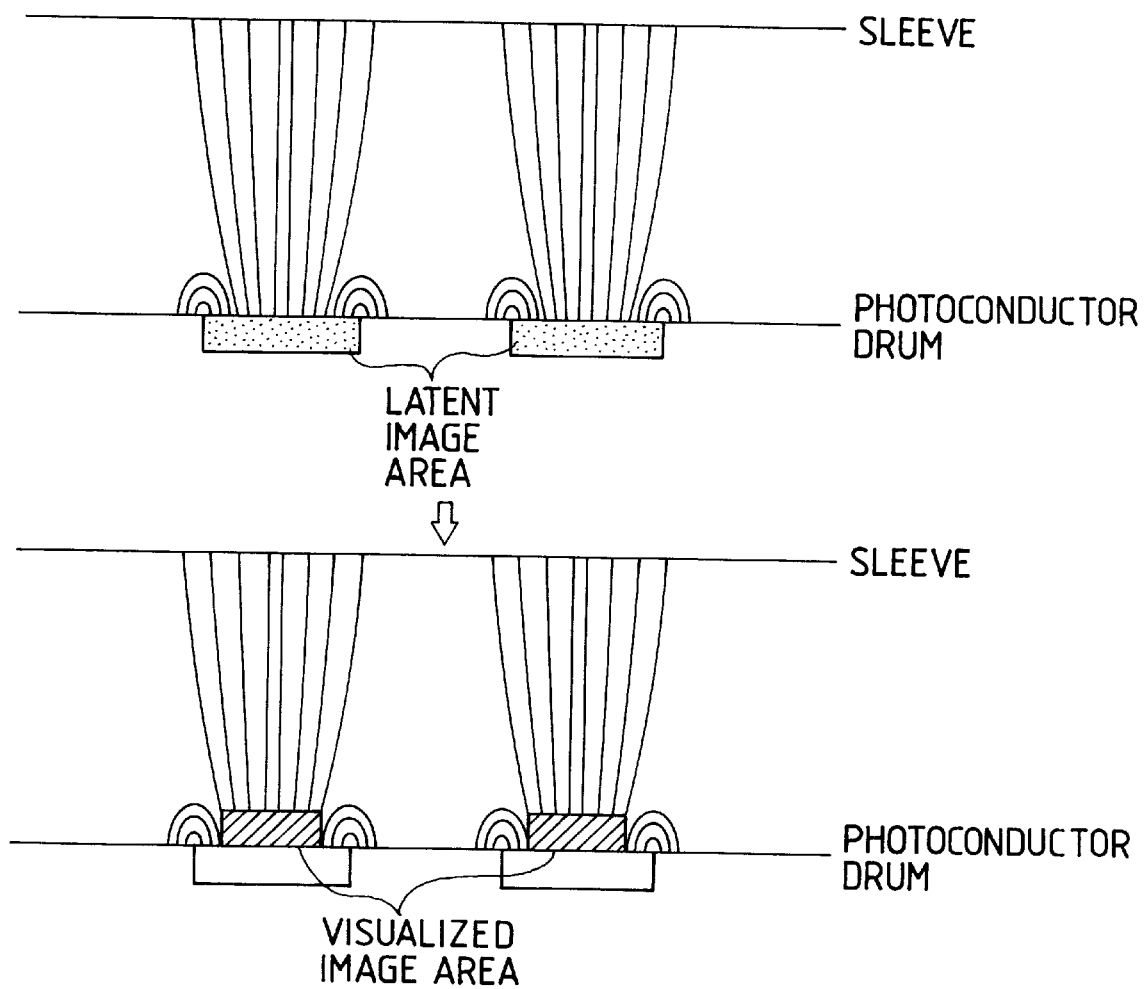
FIG. 42 shows a manner of an electric field at a portion of the color image forming apparatus by the prior art non-contact developing system.

Accordingly, in accordance with the Modification 2, for the image shown in FIG. 39, the image is formed with the 600-line for the edge along the sub-scan direction in FIG. 41.

In this manner, the white stripe is prevented and the outline can be formed with high precision.

[Modification 3]

The edge detection unit of the Embodiment 2 is provided with the 8-dot register circuit and detects both of the falling end pixel and the rising end pixel of the data level for each color component as shown in FIG. 27.

On the other hand, only the falling end pixel of the data level may be detected for each color component and the predetermined value may be added to the detected pixel under consideration as it is in the Embodiment 2.

In the above Embodiment 2 and the Modification thereof, the laser emission is rendered small by the image processing near the edge. Alternatively, a control signal to render the laser emission small may be directly applied to the laser driver to render the laser emission small near the edge.

Further, since the narrowing is not very prominent at the boundary to the white image area, the laser emission at the small level may be omitted for the boundary to the white image area so that the edge at the boundary of the white image area and the color image area may be enhanced.

In accordance with the Embodiment 2, the edge is detected and the control is made to render the laser emission small near the edge so that the fogging phenomenon in the non-print area does not occur and the narrowing of the image, that is, the white stripe is prevented.

Further, the fogging phenomenon in the non-print area is prevented, the narrowing of the image, that is, the white stripe is prevented and the outline is reserved.

The present invention is not limited to the above embodiments and various modifications thereof may be made without departing from the scope of the claims.

What is claimed is:

1. An image processing apparatus comprising:
   input means for inputting color image data;
   edge detection means for detecting an edge based on the input color image data; and
   control means for controlling a light emitting device in an image forming unit to emit light at a small emission level for pixels near the edge, in order to not form an image at the pixels near the edge.

2. An image processing apparatus according to claim 1, wherein an image is not formed at the small light emission level of the light emission device in said image forming unit.

3. An image processing apparatus according to claim 1, wherein the color image data comprises color components corresponding to recording agents used in said image forming unit, and said edge detection means detects the edge independently for each color component.

4. An image processing apparatus according to claim 1, wherein said image forming unit is capable of forming the image with a plurality of resolutions and forms the image at a high resolution for the edge.

5. An image processing apparatus according to claim 1, wherein said edge detection means detects the edge along a main scan direction in the formation of the image.

6. An image processing apparatus according to claim 1, further comprising image forming means for forming the image by using pulse width modulation and electronic photography.

7. An image processing apparatus comprising:
   input means for inputting color image data;
   outline detection means for detecting an outline of an image based on the color image data;
   color conversion means for generating color density image data corresponding to recording agents used in an image forming unit based on the color image data;
   edge detection means for detecting an edge based on the color density image data; and
   control means for controlling a light emitting device in said image forming unit to emit a light at a small light emission level for pixels near the edge in order to not form an image at the pixels near the edge, and controlling to form the image at a high resolution for the outline.

8. An image processing apparatus according to claim 7, wherein the color image data comprises color components corresponding to the recording agents used in said image forming unit, and said edge detection means detects the edge independently for each color component.

9. An image processing apparatus according to claim 7, wherein said edge detection means detects the edge along a main scan direction in the formation of the image.

10. An image processing method comprising the steps of:
    inputting color image data;
    detecting an edge based on the input color image data; and
    controlling a light emitting device in an image forming unit to emit a light at a small light emission level for pixels near the edge, in order to not form an image at the pixels near the edge.

11. An image processing method comprising the steps of:
    inputting color image data;
    detecting an outline of an image based on the color image data;
    generating a color density image data corresponding to recording agents used in an image forming unit based on the color image data;
    detecting an edge based on the color density image data; and
    controlling a light emitting device in the image forming unit to emit a light at a small light emission level for pixels near the edge in order to not form an image at the pixels near the edge, and to form the image at a high resolution for the outline.

* * * * *

UNITED STATES PATENT AND TRADEMARK OFFICE
CERTIFICATE OF CORRECTION

PATENT NO.   : 6,075,904
DATED        : June 13, 2000
INVENTOR(S)  : Takashi Kawana et al.

It is certified that error appears in the above-identified patent and that said Letters Patent is hereby corrected as shown below:

Title page,
"Item [76] Inventors: Takashi Kawana; Tetsuya Kobayashi, both of c/o Canon Kabushiki Kaisha 30-2, Shimomaruko 3-chrome, Ohta-ku, Tokyo, Japan" should read -- [75] Inventors: Takashi Kawana, Yokohama; Tetsuya Kobayashi, Kawasaki, both of Japan --;

Insert: -- [73] Assignee: Canon Kabushiki Kaisha, Tokyo, Japan --;

Item [22], Filed,
"Jun. 12, 1999" should read -- Jun. 12, 1996 --; and

Item [56], References Cited,
Under "*Assistant Examiner* -Stephen Brinich" insert -- *Attorney, Agent or Firm*- Fitzpatrick, Cella, Harper & Scinto --.

Column 1,
Line 49, "min/sec" should read -- mm/sec --.

Column 2,
Line 14, "advance" should read -- advanced --; and
Line 58, "merit" should read -- advantage --.

Signed and Sealed this

Twenty-fifth Day of December, 2001

Attest:

*Attesting Officer*

JAMES E. ROGAN
*Director of the United States Patent and Trademark Office*